United States Patent [19]

Mills et al.

[11] Patent Number: 5,631,961
[45] Date of Patent: May 20, 1997

[54] DEVICE FOR AND METHOD OF CRYPTOGRAPHY THAT ALLOWS THIRD PARTY ACCESS

[75] Inventors: Robert A. Mills, Gambrills; Mark R. Unkenholz, Eldersburg; Mark W. Wilson, Columbia; John E. Burroughs, Annapolis, all of Md.

[73] Assignee: The United States of America as represented by the Director of the National Security Agency, Washington, D.C.

[21] Appl. No.: 528,966

[22] Filed: Sep. 15, 1995

[51] Int. Cl.$^6$ ..................................... H04K 1/00
[52] U.S. Cl. ............................ 380/21; 380/28; 380/23; 380/4; 380/30
[58] Field of Search ..................... 380/21, 28, 30, 380/23, 24, 25, 3, 4, 49

[56] References Cited

U.S. PATENT DOCUMENTS

| | | | |
|---|---|---|---|
| 4,304,961 | 12/1981 | Campbell, Jr. | 178/22.08 |
| 4,908,861 | 3/1990 | Brachtl et al. | 380/25 |
| 4,965,827 | 10/1990 | McDonald | 380/25 |
| 5,276,737 | 1/1994 | Micali | 380/30 |
| 5,555,303 | 9/1996 | Stambler | 380/25 |
| 5,557,346 | 9/1996 | Lipner et al. | 380/21 |

OTHER PUBLICATIONS

Federal Register vol. 58, No. 145, A Proposed Federal Information Processing Standard for an Escrowed Encryption Standard (ESS) 58FR40791.

*Primary Examiner*—David C. Cain
*Attorney, Agent, or Firm*—Robert D. Morelli

[57] ABSTRACT

A device for and method of transmitting an encrypted message and an access field from a sender to a receiver, where a third party may intercept and process the transmission. The sender and receiver agree on a session key. The sender raises an element of a Galois Field to the session key; forms a temporary device unique key; encrypts the session key with the temporary device unique key; forms a temporary family key; encrypts an identifier of the sender and the encrypted session key using the temporary family key; encrypts a plaintext message using the session key; forms the access field by concatenating the element of a Galois Field raised to the session key to the encrypted version of the sender's identifier and the sender's encrypted session key; concatenates the ciphertext to the access field; and transmits the access field and the ciphertext to the receiver. The receiver may recover the plaintext from the sender's transmission. The third party may partially process the transmission to find the identity of the sender. The third party may then request an escrowed key that would allow the third party to recover the plaintext of the sender's message.

38 Claims, 12 Drawing Sheets

THIRD-PARTY IS GIVEN:
A SECRET FAMILY KEY (Xf); AND
DATA ASSOCIATED WITH VALID IDENTIFICATION NUMBERS

THIRD-PARTY INTERCEPTS THE U, V, AND CIPHERTEXT
TRANSMITTED FROM SENDER TO RECIPIENT

THIRD-PARTY FORMS A FIRST TEMPORARY KEY USING
Xf, U, AND A COMMUTATIVE ONE-WAY FUNCTION BLOCK

THIRD-PARTY DECRYPTS V USING THE FIRST TEMPORARY KEY

THIRD-PARTY EXTRACTS DATA BASED ON THE SENDER'S
IDENTIFICATION NUMBER AND THE SENDER'S ENCRYPTED
SESSION KEY

THIRD-PARTY RECOVERS DATA ASSOCIATED WITH THE
IDENTIFICATION NUMBER OF SENDER

THIRD-PARTY FORMS A SECOND TEMPORARY KEY USING
THE DATA ASSOCIATED WITH THE IDENTIFICATION NUMBER
OF THE SENDER AND U USING A COMMUTATIVE ONE-WAY
FUNCTION BLOCK

THIRD-PARTY DECRYPTS THE DATA BASED ON THE SENDER'S
ENCRYPTED SESSION KEY TO RECOVER THE SENDER'S SESSION
KEY SK USING THE SECOND TEMPORARY KEY

THIRD-PARTY DECRYPTS THE CIPHERTEXT TO RECOVER THE
SENDER'S PLAINTEXT USING THE SK RECOVERED

FIG. 5

```
SENDER GIVEN p, q, g, Yi, Yf, f, h, Tag, ri, si, PAD1, AND PAD2
                        │
        SENDER AND RECIPIENT AGREE ON SK
                        │
        GENERATE A RANDOM NUMBER IV
                        │
              FORM m=f(IV, SK)
                        │
              FORM U=g^m mod p
                        │
             FORM t=h(Yi^m mod p)
                        │
             FORM w=h(Yf^m mod p)
                        │
    FORM V=Ew(IV, (IDi ‖ Yi ‖ ri ‖ si ‖ Et(SK) ‖ PAD1))
                        │
              FORM z=IV ‖ PAD2
                        │
              FORM sk*=Ez(SK)
                        │
              FORM Ct=Esk*(IV, pt)
                        │
       FORM ACCESS FIELD  TAG ‖ IV ‖ U ‖ V
                        │
     TRANSMIT CT ‖ ACCESS FIELD TO RECIPIENT
```

DEVICE FOR AND METHOD OF CRYPTOGRAPHY THAT ALLOWS THIRD PARTY ACCESS

FIELD OF THE INVENTION

This invention relates to a device for and a method of cryptography and, more particularly, to a device for and method of cryptography that allows third party access to encrypted messages between a first and second party.

BACKGROUND OF THE INVENTION

Federal Register Vol. 59, No. 27 announced approval of Federal Information Processing Standards Publication 185 (FIPS-185), Escrowed Encryption Standard (EES). This standard specifies a technology developed by the Government of the United States of America for providing strong encryption of unclassified information and to provide for escrowed keys. This latter feature assists law enforcement agencies and other government agencies, under proper legal authority, in the collection and decryption of electronically transmitted information.

Key escrow technology was developed to address the concern that widespread use of encryption would hinder lawfully authorized electronic surveillance. In the past, law enforcement authorities have encountered very little encryption because of the expense and difficulty in using this technology. More recently, however, low-cost encryption technology has become commercially available to all. The key escrow technology provided by FIPS-185 addresses the needs of the private sector for secure cryptography and the needs of U.S. law enforcement to conduct lawfully authorized electronic surveillance.

FIPS-185 specifies use of a symmetric-key encryption (and decryption) algorithm and a Law Enforcement Access Field (LEAF) creation method which allows the decryption of encrypted telecommunications by authorized law enforcement agencies.

The definition of "escrow" in the present invention is the delivery to a third person of an item that is to be given to a grantee only upon the fulfillment of a condition. Therefore, a key escrow system is one that entrusts one or more components comprising a cryptographic key to one or more key-component holders (i.e., escrow agents). The key-component holders provide the components of a key to a "grantee" (e.g., a law enforcement official) only upon fulfillment of the condition that the grantee obtain proper legal authorization to conduct electronic surveillance of a particular device whose key is being requested. The key components obtained through this process are then used by the grantee to obtain the session key used by the particular device. The session key is then used to decrypt the message sent by the device of interest.

Data for purposes of this patent application includes voice, facsimile, and computer information communicated in a telephone system.

The following terms are used as defined below: a) decryption is the conversion of ciphertext to plaintext through the use of a cryptographic algorithm; b) digital data is data that have been converted to a binary representation; c) encryption is the conversion of plaintext to ciphertext through the use of a cryptographic algorithm; d) key components are the parts from which a key may be derived; e) key escrow is the process of managing (e.g., generating, storing, transferring, auditing) the components of a cryptographic key by key component holders; and f) LEAF creation method is a part of a key escrow system that is implemented in a cryptographic device and creates a Law Enforcement Access Field.

FIPS-185 requires the following functions, at a minimum, to be implemented: a) data encryption, where a session key is used to encrypt plaintext information in one or more modes of operation specified in FIPS-81 (i.e., electronic codebook, cipher block chaining, output feedback, and cipher feedback); b) data decryption, where the session key used to encrypt the data is used to decrypt resulting ciphertext to obtain the data; and c) LEAF creation, where a family key and a unique key are used to create a Law Enforcement Access Field (LEAF) in accordance with a LEAF Creation Method, and where the LEAF is transmitted in a way that allows it to be decrypted with legal authorization.

FIPS-185 requires the use of the following parameters: a) a device unique identifier (UID), where the UID is unique to a particular device, and where the UID is used by the Key Escrow System; b) a device unique key (KU), where KU is a cryptographic key that is unique to a particular device and used by the Key Escrow System; c) cryptographic protocol field (CPF), where CPF is the field identifying the registered cryptographic protocol used by a particular application and used by the Key Escrow System; d) escrow authenticator (EA), where EA is a binary pattern that is inserted in the LEAF to insure that the LEAF is transmitted and received properly and has not been modified, deleted, or replaced in an unauthorized manner; e) initialization vector (IV), where IV is a mode and application dependent vector of bytes used to initialize, synchronize, and verify the encryption, decryption, and key escrow functions; f) family key (KF), where KF is the cryptographic key stored in all devices designated as a family that is used to create a LEAF; g) session key (KS), where KS is the cryptographic key used by a device to encrypt and decrypt data during a session; and h) Law Enforcement Access Field (LEAF), where LEAF is the field containing the encrypted session key and the device identifier and the escrow authenticator.

The LEAF is transmitted with the ciphertext. The device unique key is composed of two components, where each component is independently generated and stored by an escrow agent. The session key used to encrypt transmitted information is used to decrypt received information.

The escrowed encryption standard described in FIPS-185 uses symmetric keys (i.e., keys that are used for both encryption and decryption). The symmetric keys, which are stored in the device, are subject to reverse engineering. The present invention discloses an escrowed encryption device and method that does not require the storage of a secret key and is, therefore, not susceptible to reverse engineering. From a security standpoint, the present invention is substantially stronger than a symmetric-key escrowed-encryption system. Instead, the present invention uses public key techniques to transmit and store in the device a public version of the key.

The closest prior art would most likely be found amongst devices for and methods of creating an access code. For example, the prior art may include U.S. Pat. Nos. 4,304,961 (entitled "AUTHENTICATOR CODE GENERATOR"), 4,908,861 (entitled "DATA AUTHENTICATION USING MODIFICATION DETECTION CODES BASED ON A PUBLIC ONE WAY ENCRYPTION FUNCTION"), and 4,965,827 (entitled "AUTHENTICATOR"). One difference between these patents and the present invention is the manner in which the secure transformation is accomplished. Another difference is the public-key processing contained in the present invention that is not contained in these prior art patents.

U.S. Pat. No. 5,276,737, entitled "FAIR CRYPTOSYSTEMS AND METHODS OF USE," discloses a cryptosystem that requires the users to break a traffic key into shares. Each share would then be held by a trustee so that no one trustee could reconstruct the traffic key. Each trustee is provided with information that would enable each trustee to independently verify that the trustee is in possession of a share of a traffic key. The present invention differs from U.S. Pat. No. 5,276,737 in that the present invention does not require the traffic key be broken into shares and given to trustees. Also, the present invention does not provide trustees with information that would enable them to independently verify that they hold a share of the traffic key.

SUMMARY OF THE INVENTION

The object of the present invention is to eliminate the vulnerability of losing a secret key via reverse engineering from an encryption device. This object is realized by disclosing a encryption device and method that uses public-key techniques to encrypt and store the secret key. The secret key is encrypted using a commutative one-way function that makes the secret key irretrievable without knowing the associated decryption algorithm.

For an escrowed encryption system to work, more than a sender and a receiver may be involved. There may be an authority who signs public keys, an authority who signs secret keys, and escrow agents who hold parts of the secret keys.

The present invention envisions at least three parties to an encrypted communication, a sender, a receiver, and a third party who may eavesdrop on the communication between the sender and the receiver. The sender and receiver are each given an element g in a field (e.g., a Galois Field), a public device unique key $Y_i$ that is unique to each device, and a public family key $Y_f$ that is known by all users of the present invention. The sender and receiver agree on a session key sk that will be used to encrypt and decrypt a communication between the sender and the receiver.

The sender forms a datum U using the Galois Field element g, the session key sk and a commutative one-way function block. A one-way function is a function that is easy to compute but difficult if not impossible to undo or reverse unless an additional piece of information is available to enable one to undo the function. Presently, one-way functions may be constructed using multipliers or exponentiators. It is believed that one cannot find the factors of a number that is the product of two large prime numbers. This is commonly referred to as a factoring problem. U.S. Pat. No. 4,405,829, entitled CRYPTOGRAPHIC COMMUNICATIONS SYSTEM AND METHOD, issued to Rivest, Shamir, and Adelman, commonly referred to as the RSA cryptosystem, is based on the factoring problem. It is also believed that one cannot find the power to which a large element of a finite group has been raised. This is commonly referred to as a discrete logarithm problem. U.S. Pat. No. 4,200,770, entitled CRYPTOGRAPHIC APPARATUS AND METHOD, issued to Diffie, Hellman, and Merkle, is based on the discrete logarithm problem. A commutative one-way function is a one-way function that also exhibits the commutative property (i.e., the property that it does not matter in what order the group operation is performed).

In the preferred embodiment of the present invention, g is an element of order q in a Galois Field of order p (i.e., GF (p)), where p and q are prime numbers and q is a prime divisor of (p−1). The commutative one-way function is an exponentiator. Therefore, the datum U is g raised to sk (i.e., $U=g^{sk}$). It is believed that sk cannot be recovered from U. The present invention relies on the intractability of the discrete logarithm problem rather than the intractability of the factoring problem.

The sender forms a first temporary key using the sender's public device unique key $Y_i$, the session key sk, and a second commutative one-way function. In the preferred embodiment, the second commutative one-way function is identical to the first commutative one-way function. Therefore, the first temporary key is $Y_i$sk ("" denotes raising the item that precedes "" to the power following "").

The session key sk is then encrypted using a symmetric-key encryptor and the first temporary key as the key. The encrypted session key is then combined with an identification number unique to the sender. Preferably, the combination step is concatenation.

A third commutative-one way function is used with the public family key $Y_f$ and the session key to form a second temporary key (i.e., $Y_f$**sk). The second temporary key is used as the key to a second symmetric-key encryptor for encrypting the combination of sender's identification number and the encrypted session key. The result is a datum that will be referred to as V.

The sender's plaintext message is encrypted to form a ciphertext message using a third symmetric-key encryptor and the session key sk as the key. The first, second, and third symmetric-key encryptors may be identical to each other or they may differ from each other. Datums U, V, and the ciphertext are then sent to the receiver.

The receiver receives datums U, V, and the ciphertext from the sender. Knowing the Galois element g and the session key sk, the receiver forms a datum that should be identical to the datum U received using a commutative one-way function that is identical to the commutative one-way function used by the sender to form the datum U. The receiver then compares the datum formed to the datum U received. If they match, processing continues. Otherwise, processing is halted.

The receiver uses the sender's public device unique key $Y_i$, the session key sk, and a second commutative one-way function block to form a first temporary key (e.g., $Y_i$**sk). The receiver uses the first temporary key to encrypt the session key sk using a symmetric-key encryptor. The symmetric-key encryptor is identical to the symmetric-key encryptor used by the sender to encrypt the session key sk.

The receiver uses the public family key $Y_f$, the session key sk, and a third commutative one-way function block to form a second temporary key (e.g., $Y_f$**sk). The receiver's first, second, and third commutative one-way function blocks may be the same or they may be different, but they must correspond to the first, second, and third commutative one-way function blocks used by the sender. That is, the sender and receiver must use like commutative one-way function blocks for like purposes.

The receiver's second temporary key is used as the key for a first symmetric-key decryptor which is used to decrypt the datum V received from the sender. The first decryptor must be able to undo or reverse the output of the sender's second encryptor. An extractor is used to separate the sender's encrypted session key from the sender's identification number. The sender's encrypted session key is then compared to the receiver's encrypted session key. If the encrypted session keys match, processing continues. Otherwise, processing is halted.

If both of the comparisons made by the receiver are successful then the receiver decrypts the ciphertext received from the sender using the session key sk as the key to a second symmetric-key decryptor. The second symmetric-key decryptor must be able to undo or reverse the result of the third symmetric-key encryptor used by the sender to encrypt the sender's plaintext message.

In the present invention, a third party may under proper circumstances gain access to communications between the sender and the receiver. The third party may be anyone who has a legitimate need to gain access to such a communication (e.g., employers, law enforcement agencies, etc.). Proper authority may come from an employment agreement or an order of a court. It may also be required that the third party seek from one or more authorizing entities the necessary items to recover the communication between a sender and a receiver The third party is given a secret family key $x_f$, which corresponds to the public family key $Y_f$ held by both the sender and the receiver. The third party is also given data based on the identification numbers of all of the valid senders.

The third party intercepts the datums U, V, and the ciphertext sent by the sender to the receiver. The third party uses the secret family key $x_f$, the intercepted datum U, and a first commutative one-way function block to form a first temporary key (e.g., $U^{**}x_f$). The first commutative one-way function block is identical to the third commutative one-way function blocks used by the sender and the receiver (i.e., the commutative one-way function blocks that uses the public family key $Y_f$).

The first temporary key is used as the key for a first symmetric-key decryptor to decrypt the intercepted datum V. The first symmetric-key decryptor must be able to undo or reverse the result of the second symmetric-key encryptor used by the sender. The result of the decryption is the sender's identification number and the sender's encrypted session key.

The combination based on the sender's identification number and the sender's encrypted session key is separated into two component parts. The first component part is based upon the sender's identification number while the second component part is based on the sender's encrypted session key. The bits based on the sender's identification number is used as an address to a memory unit. The output of the memory unit $x_i$ is used with the intercepted datum U and a second commutative one-way function block to form a second temporary key (e.g., $U^{**}x_i$).

The second temporary key is used with a second symmetric-key decryptor to decrypt the bits based on the sender's encrypted session key in order to recover the sender's session key. The second symmetric-key decryptor must be able to undo or reverse the result of the sender's first symmetric-key encryptor.

With the session key sk and a third symmetric-key decryptor, the third party decrypts the intercepted ciphertext message in order to recover the sender's plaintext message. The third symmetric-key decryptor must be able to undo or reverse the result of the sender's third symmetric-key encryptor.

In an alternate embodiment of the present invention, the following system-wide parameters are used:

a) p=a prime number;
b) q=a prime divisor of p−1;
c) g=an element of order q in GF (p);
d) $x_u$=a universal secret (i.e., master) key;
e) $x_e$=a secret key known only by an escrow certification authority;
f) $x_f$=a secret family, or common, key, where $x_f$ is known only by the third party;
g) $Y_u=(g^{**}x_u)$mod p, the universal public key;
h) $Y_e=(g^{**}x_e)$mod p, an escrow certifier's public key;
i) $Y_f=(g^{**}x_f)$mod p, the public family key;
j) Tag=an identification field in a third party access field;
k) $k_e$=a secret key, known only by a holder of the universal secret key;
l) $r_e=((g^{**}k_e)$ mod p)mod q, half of an escrow certifier's signature; and
m) $s_e=(k_e-1)$ $(SHA(Y_f\|Tag \|Y_e)+(x_u)$ $(r_e))$mod q, the other half of the escrow certifier's signature, where "∥" denotes concatenation. The term "SHA" refers to a secure hash algorithm.

The following information is unique to each user of the alternate embodiment of the present invention:

a) $ID_i$=user i's identification number;
b) $x_{i1}$=a secret unique key held by a first escrow agent;
c) $x_{i1}$=a secret unique key held by a second escrow agent;
d) $Y_i=((g^{**}(x_{i1}+x_{i2})$ mod q) mod p), the device unique public key;
e) $k_i$=a secret key known only by the escrow certifier;
f) $r_i=((g^{**}k_i)$ moood p) moood q, one-half of the signature for device i; and
g) $s_i=(k_{i-}1)$ $(SHA(Y_f\|Tag \|ID_i\|Y_i)+(x_e)$ $(r_i))$mod q, the other half of the signature for device i.

To send a message, a sender does the following:

(a) the sender knows p, q, g, $Y_i$, $Y_f$, f, h, $r_i$, $s_i$, and Tag;
(b) the sender and recipient know the session key (sk);
(c) generate a random number (IV);
(d) form m=f (IV,sk);
(e) form $U=g^m$ mod p;
(f) form $t=h((Y_i^{**}m)$ mod p);
(g) form $w=h((Y_f^{**}m)$ mod p);
(h) form $V=E_w(IV, (ID_i\|Y_i\|r_i\|s_i\|E_t(sk)$ ∥first pad)), where "$E_w$" denotes an encryption algorithm that uses w as a key to encrypt the data within the parens;
(i) form z=IV∥second pad;
(j) form $sk^*=E_z(sk)$;
(k) form $ct=E_{sk^*}(IV, pt)$;
(l) form the third party access field (e.g., Tag∥IV∥U∥V); and
(m) transmit ct concatenated to the third party access field to the recipient.

To recover the plaintext, the recipient would do the following:

(a) the recipient knows the p, q, g, $Y_f$, f, h, sk used by the sender;
(b) receive ct and the third party access field from the sender;
(c) recover IV, U, V, and Tag from the third party access field;
(d) form m=f(IV, sk);
(e) form $U=g^m$ mod p;
(f) proceed if U recovered equals U formed, otherwise, stop;
(g) form $w=h((Y_f^{**}m)$ mod p);
(h) recover $Y_i$, $r_i$, $s_i$, $ID_i$, and $E_t(sk)$ from the third party access field by decrypting V;
(i) verify the signature ($r_i$, $s_i$) recovered in step (h) using the Tag recovered in step (c) and the $ID_i$ and $Y_i$ recovered in step (h), proceed if the signature $(r_i, s_i)$ is verified, otherwise, stop;

(j) form $t=h((Y_i^{**}m) \bmod p)$ using the $Y_i$ recovered in step (h);

(k) recover sk by decrypting $E_t(sk)$;

(l) proceed if sk recovered equals sk known, otherwise, stop;

(m) form z=IV||second pad;

(n) form $sk^*=E_z(sk)$; and (o) recover the plaintext message (pt) by decrypting the ct using sk* (i.e., $D_{sk*}$(IV, ct), where "$D_{sk*}$" denotes a decryption algorithm that uses sk* as a key to decrypt the contents of the parens).

While the sender is sending ct and the third party access field to the recipient, an authorized third party may do the following:

(a) the third party knows p, q, g, $Y_f$, $x_f$, h, and D;

(b) intercept the ct concatenated with the third party access field;

(c) recover Tag, IV, V, and U from the third party access field;

(d) identify the secret family key, $x_f$, from the Tag;

(e) form $w=h((U^{**}x_f) \bmod p)$;

(f) recover $ID_i$, $Y_i$, $r_i$, $s_i$, and $E_t(sk)$ from V by decrypting V using w and IV (i.e., $D_w$(IV, V));

(g) verify the $(r_i, s_i)$ received;

(h) identify the escrow agents from the Tag;

(i) request $x_{i1}$ from the first escrow agent and $x_{i2}$ from the second;

(j) form $x_i=(x_{i1}+x_{i2}) \bmod q$;

(k) form $t=h((U^{**}x_i) \bmod p)$;

(l) recover sk by decrypting $E_t(sk)$;

(m) form z=IV||second pad;

(n) form $sk^*=E_z(sk)$; and (o) recover the plaintext message by decrypting ct using sk* (i.e., $D_{sk*}$ (IV, ct)).

BRIEF DESCRIPTION OF THE DRAWINGS

FIG. 5 is a flow chart of the steps that a third party performs;

FIG. 7 is a flow chart of the steps that a sender performs in the alternate embodiment of the present invention;

DETAILED DESCRIPTION

The present invention discloses a public-key escrowed encryption device that eliminates the weaknesses associated with storing a secret key in an encryption device. Instead of storing the secret key that may be lost via reverse engineering, the present invention uses public-key techniques to store and transmit an encrypted secret key. The secret key is encrypted using commutative one-way functions that are believed to render the encrypted secret-key irretrievable absent knowledge of the associated decryption algorithm.

The present invention envisions at least three parties to an encrypted communication, a sender, a receiver, and a third party who, under certain circumstances, may eavesdrop on the communication between the sender and the receiver.

Figure 1:
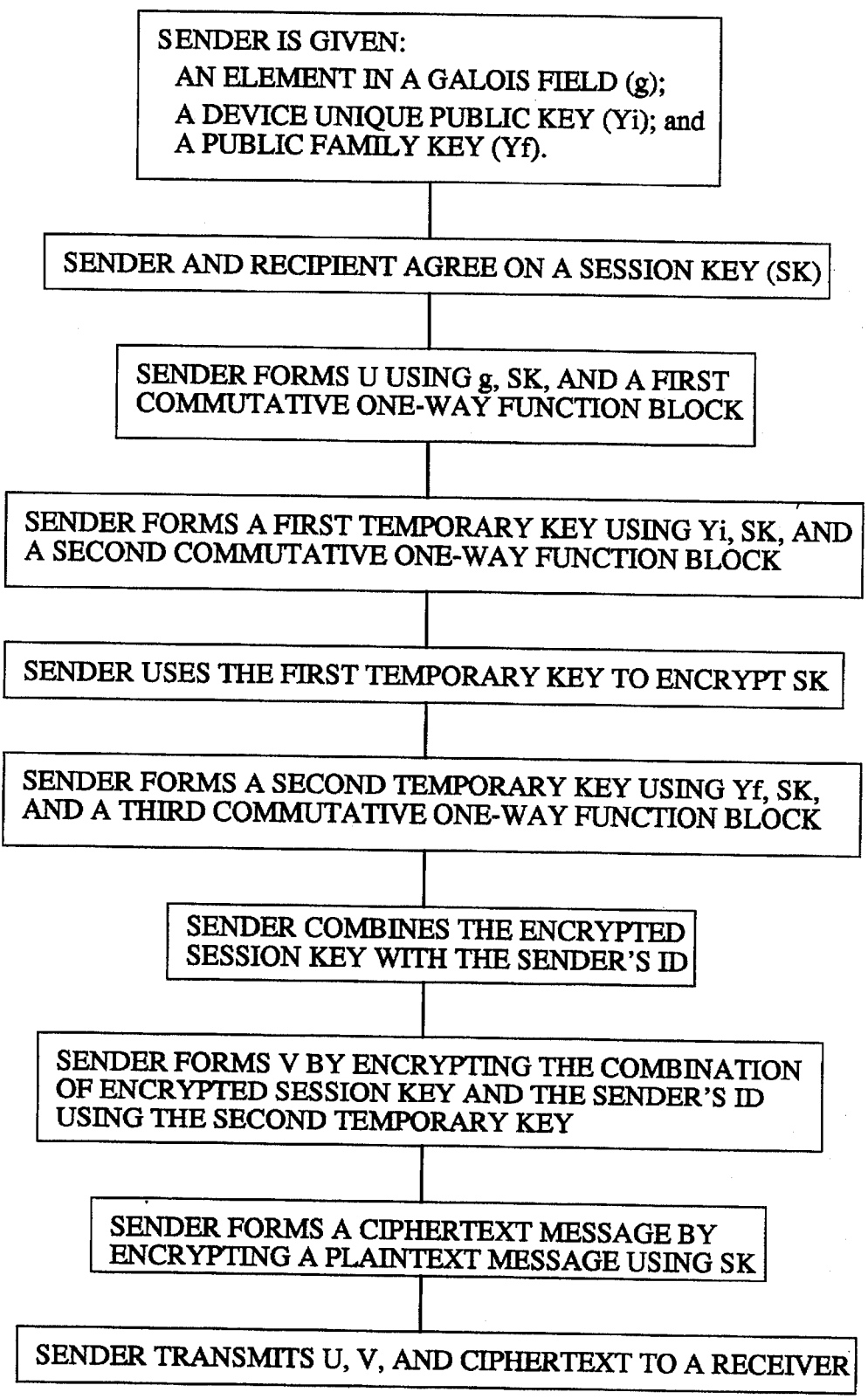
FIG. 1 is a flow chart of the steps that a sender performs.

FIG. 1 illustrates the method that the sender must go through to send a message to the receiver. The sender is given an element g in a Galois Field, a public device unique key $Y_i$ that is unique to the sender's device, and a public family key $Y_f$ that is known by all users of the present invention.

The sender and receiver agree on a session key that will be used to encrypt and decrypt communications between the sender and the receiver.

The sender forms a datum U using the Galois Field element g, the session key sk and a first commutative one-way function block. A one-way function is a function that is easy to compute but difficult if not impossible to undo or reverse unless an additional piece of information is available to enable one to undo the function. In the preferred embodiment of the present invention, g is an element of order q in a Galois Field of order p (i.e., GF(p)), where p and q are prime numbers, and q is a prime divisor of (p−1). The first commutative one-way function block is an exponentiator. Therefore, the datum U is equal to g raised to the session key sk (i.e., $U=g^{sk}$). It is believed that the session key sk cannot be recovered from U.

The sender forms a first temporary key using the sender's public device unique key $Y_i$, the session key sk, and a second commutative one-way function block. In the preferred embodiment, the second commutative one-way function block is identical to the first commutative one-way function block. Therefore, the first temporary key is $Y_i^{**}sk$.

The first temporary key is used to encrypt the session key sk using a first symmetric-key encryptor. The encrypted session key is then combined with an identification number that is unique to the sender. In the preferred embodiment, the combination step is concatenation.

A second temporary key is formed using the session key sk, the public family key $Y_f$, and a third commutative-one way function block (e.g., the second temporary key is $Y_f^{**}sk$). The second temporary key is used as the key to a second symmetric-key encryptor to encrypt the combination of the sender's identification number and the encrypted session key. The result is a datum referred to as V.

A plaintext message that the sender wishes to encrypt and send to the receiver is encrypted using the session key sk and a third symmetric-key encryptor. The first, second, and third symmetric-key encryptors may be the same or they may be different. Datums U, V, and the ciphertext are then sent to the receiver.

Figure 2:
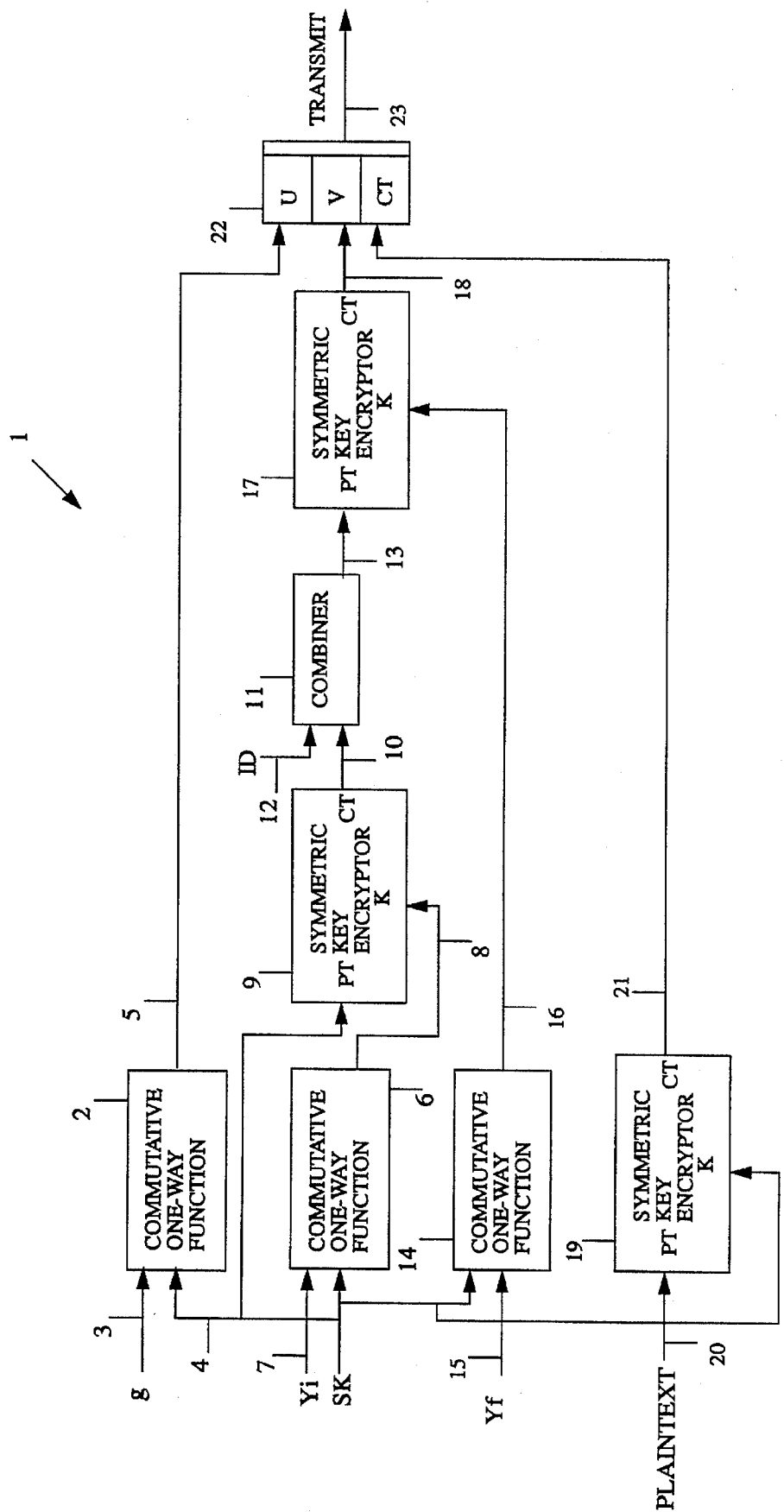
FIG. 2 is a schematic of a device used by the sender.

FIG. 2 is a schematic of the sender's device 1. A first commutative one-way function block 2 receives a Galois field element g along a first input 3 and receives a session key sk along a second input 4. The output 5 of the first commutative one-way function block 2 forms a datum U. The commutative one-way function block 2 may be realized with a multiplier or an exponentiator. In the preferred embodiment, the commutative one-way function block 2 is an exponentiator. Therefore, U is equal to $g^{sk}$.

A second commutative one-way function block 6 receives a public device unique key $Y_i$ via a first input 7 and receives the session key sk via a second input 4. In the preferred embodiment, the second commutative one-way function block 6 is identical to the first commutative one-way function block 2. Therefore, the output 8 of the second commutative one-way function block 6 is a datum that represents a first temporary key (i.e., $Y_i**sk$).

A first symmetric-key encryptor 9 uses the first temporary key as the key to encrypt the session key sk. The first symmetric-key encryptor 9 has a first input 4 for receiving the session key sk as plaintext, a second input connected to the output 8 of the second commutative one-way function block 6 for receiving the first temporary key as the key, and an output 10 for transmitting the encrypted session key. The first symmetric-key encryptor 9 may be realized with any secure symmetric-key encryptor.

The encrypted session key is combined with an identification number that is unique to the sender's device 1. A combiner 11 for combining the identification number and the encrypted session key has a first input connected to the output 10 of the first symmetric-key encryptor 9 for receiving the encrypted session key, a second input 12 for receiving the identification number, and an output 13 for transmitting the combination of identification number and encrypted session key. The combiner 11 may be realized in many ways. In the preferred embodiment, the combiner concatenates the identification number to the encrypted session key.

A third commutative one-way function block 14 is used to form a second temporary key using the session key and the public family key $Y_f$. The third commutative one-way function block 14 has a first input 4 for receiving the session key sk, a second input 15 for receiving the public family key $Y_f$, and an output 16 for transmitting the second temporary key. The third commutative one-way function block 14 is identical to the first commutative one-way function block 2. Therefore, the output 16 of the third commutative one-way function block 14 transmits $Y_f**sk$.

A second symmetric-key encryptor 17 uses the second temporary key as the key to encrypt the combination of identification number and encrypted session key. The second symmetric-key encryptor 17 has a first input connected to the output 13 of the combiner 11 for receiving the output of the combiner 11 as plaintext, a second input connected to the output 16 of the third commutative one-way function block 14 for receiving the second temporary key as key, and an output 18 for transmitting the result which is a datum referred to as V. The second symmetric-key encryptor 17 may be identical to the first symmetric-key encryptor 9.

A third symmetric-key encryptor 19 uses the session key sk as the key to encrypt the plaintext message that the sender wishes to send to the receiver. The third symmetric-key encryptor 19 has a first input 4 for receiving the session key sk as the key, a second input 20 for receiving the plaintext, and an output 21 for transmitting the resulting ciphertext. The third symmetric-key encryptor 19 may be identical to the first symmetric-key encryptor 9.

The output 5 of the first commutative one-way function block 2, the output 18 of the second symmetric-key encryptor 17, and the output 21 of the third symmetric-key encryptor 19 are connected, respectively, to a first input, a second input, and a third input to the register 22. The register 22 has an output 23 from which the datum U, V, and the ciphertext may be transmitted to the receiver.

Figure 3:
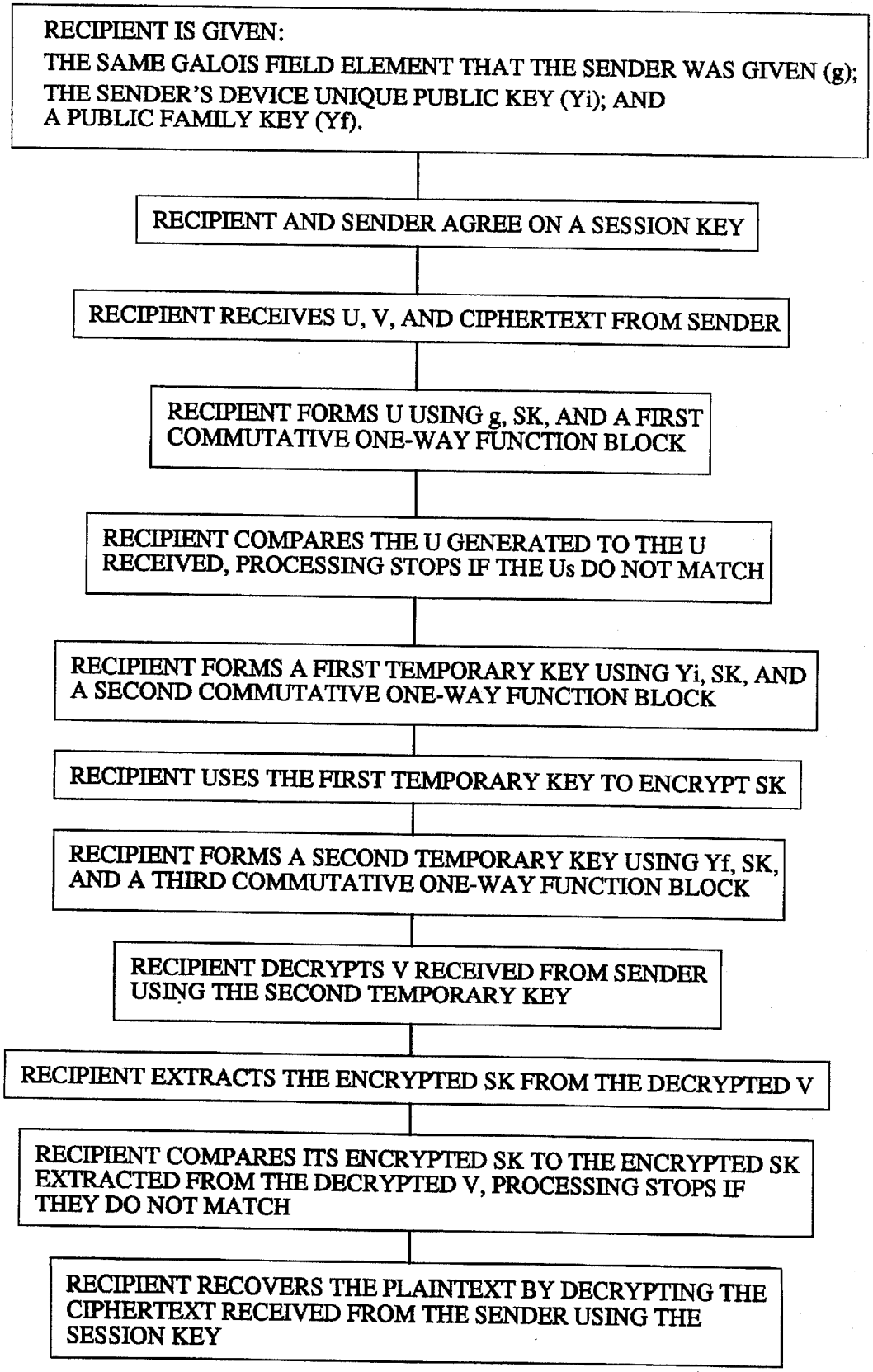
FIG. 3 is a flow chart of the steps that a recipient performs.

FIG. 3 illustrates the steps that the receiver must perform. The receiver receives datums U, V, and the ciphertext from the sender. Knowing the Galois element g and the session key sk, the receiver forms a datum that is identical to the datum U from the sender. The receiver uses a commutative one-way function that is identical to the commutative one-way function used by the sender to form the datum U. The receiver then compares the datum it formed to the datum U received from the sender. If they match, processing continues. Otherwise, processing is halted.

The receiver uses the sender's public device unique key $Y_i$, the session key sk, and a second commutative one-way function block to form a first temporary key (e.g., $Y_i**sk$). The receiver uses the first temporary key to encrypt the session key sk using a first symmetric-key encryptor. The receiver's first symmetric-key encryptor is identical to the symmetric-key encryptor used by the sender to encrypt the session key sk.

The receiver uses the public family key $Y_f$, the session key sk, and a third commutative one-way function block to form a second temporary key (e.g., $Y_f**sk$). The receiver's first, second, and third commutative one-way function blocks may be identical to each other or they may be different from one another, but they must correspond to the first, second, and third commutative one-way function blocks used by the sender. That is, the sender and receiver must use like commutative one-way function blocks for like purposes.

The receiver's second temporary key is used as the key for decrypting the datum V received from the sender. The receiver uses a first symmetric-key decryptor to decrypt the datum V. The receiver's first decryptor must be able to undo or reverse the output of the sender's second encryptor.

The result of decrypting the datum V is the combination of the sender's identification number and the sender's encrypted session key. These two components are separated, and the sender's encrypted session key is compared to the receiver's encrypted session key. Processing continues if they match. Otherwise, processing is halted.

If both of the comparisons made by the receiver are successful, the receiver proceeds to decrypt the ciphertext received from the sender using the session key sk as key with a second symmetric-key decryptor. The receiver's second symmetric-key decryptor must be able to undo or reverse the operation of the third symmetric-key encryptor used by the sender to encrypt the plaintext.

Figure 4:
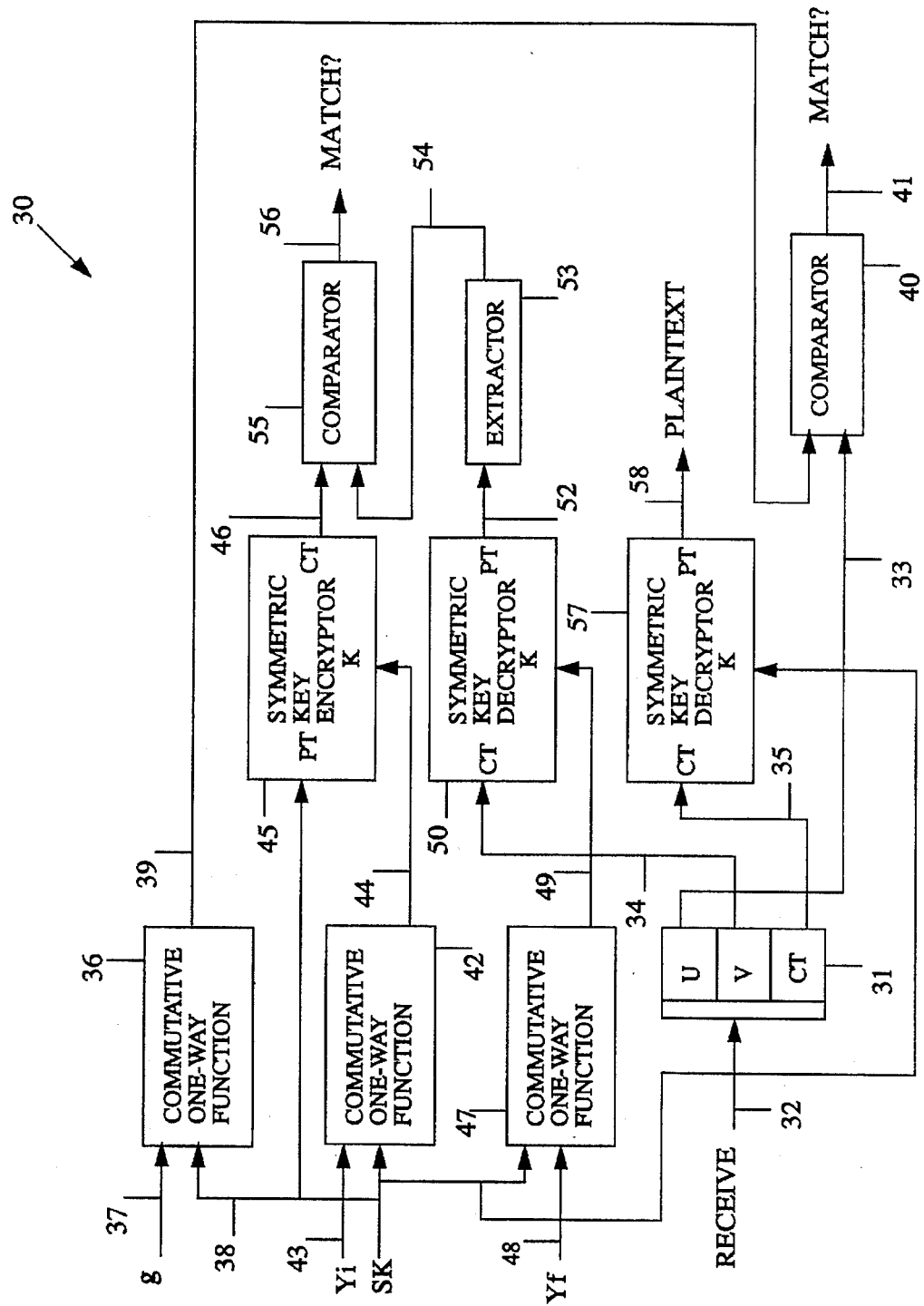
FIG. 4 is a schematic of a device used by the recipient.

FIG. 4 is a schematic of a device 30 that the receiver may use to implement the method illustrated in FIG. 3.

A register 31 receives datums U, V, and the ciphertext transmitted by the sender via an input 32. Valid data received would be data sent by a sender who has used the device 1 of FIG. 2 to generate the data. The register 31 has a first output 33 for transmitting the received datum U, a second output 34 for transmitting the received datum V, and a third output 35 for transmitting the received ciphertext.

A first commutative one-way function block 36, having a first input 37 for receiving an element g of a Galois field, having a second input 38 for receiving the session key sk, and having an output 39, is used to form a datum that is identical to the datum U received from the sender. The receiver's first commutative one-way function block 36 must be identical to the first commutative one-way function block 2 of FIG. 2 (i.e., either a multiplier or an exponentiator). In the preferred embodiment of the present invention, the sender's first commutative one-way function block 2 is an exponentiator. Therefore, the datum available at the output 39 of the receiver's first commutative one-way function block 36 is $g^{sk}$.

A comparator 40, having a first input connected to the output 39 of the receiver's first commutative one-way function block 36, having a second input connected to the first output 33 of the register 31 for receiving the sender's datum U, and having an output 41, compares the sender's datum U to the datum generated by the receiver. If the two datum's match, processing continues. Otherwise, processing is halted.

A second commutative one-way function block 42, having a first input 43 for receiving the sender's public device unique key $Y_i$, having a second input 38 for receiving the session key sk, and having an output 44, forms the receiver's first temporary key. The receiver's second commutative one-way function block 42 must be identical to the second commutative one-way function block 6 of FIG. 2 (i.e., a multiplier or an exponentiator). In the preferred embodiment, the sender's second commutative one-way function block 6 is an exponentiator. Therefore, $Y_i**sk$ appears at the output 44 of the receiver's second commutative one-way function block 42.

A symmetric-key encryptor 45, having a plaintext input 38 for receiving the session key sk as plaintext, having a key input connected to the output 44 of the second commutative one-way function block 42 for receiving the receiver's first temporary key as a key, and having a ciphertext output 46, is used to encrypt the session key sk. The receiver's symmetric-key encryptor 45 is identical to the first symmetric-key encryptor 9 of FIG. 2. Eventually, the encrypted version of the session key appearing at the output 46 of the receiver's symmetric-key encryptor 45 will be compared to the sender's encrypted session key. If they match, processing continues. Otherwise, processing is halted.

A third commutative one-way function block 47, having a first input 48 for receiving a public family key $Y_f$, having a second input 38 for receiving the session key sk, and having an output 49, forms the receiver's second temporary key. The receiver's third commutative one-way function block 47 must be identical to the third commutative one-way function block 14 of FIG. 2 (i.e., a multiplier or an exponentiator). In the preferred embodiment, the sender's third commutative one-way function block 14 is an exponentiator. Therefore, $Y_f**sk$ appears at the output 49 of the receiver's third commutative one-way function block 49.

A first symmetric-key decryptor 50, having a ciphertext input connected to the second output 34 of the register 31 for receiving the sender's datum V, having a key input connected to the output 49 of the third commutative one-way function block 47 for receiving the receiver's second temporary key as a key, and having a plaintext output 52, is used to decrypt the sender's datum V (i.e., the combination of the sender's identification number and the sender's encrypted session key). The receiver's first symmetric-key decryptor 50 must be able to undo or reverse the result of the sender's second symmetric-key encryptor 17 of FIG. 2.

An extractor 53, having an input connected to the output 52 of the first symmetric-key decryptor 50, and having an output 54, separates the sender's identification number from the sender's encrypted session key and transmits the sender's encrypted session key via the output 54.

A second comparator 55, having a first input connected to the output 46 of the symmetric-key encryptor 45 for receiving the receiver's encrypted session key, having a second input connected to the output 54 of the extractor 53 for receiving the sender's encrypted session key, and having an output 56, compares the sender's encrypted session key to the receiver's encrypted session key. If they match, processing continues. Otherwise, processing is halted.

A second symmetric-key decryptor 57, having a first input connected to the third output 35 of the register 31 for receiving the sender's ciphertext as ciphertext, having a second input 38 for receiving the session key as key, and having a plaintext output 58, decrypts the sender's ciphertext in order to recover the sender's plaintext message. The receiver's second symmetric-key decryptor 57 must be able to undo or reverse the output 21 of the sender's third symmetric-key encryptor 19.

FIG. 5 illustrates the steps that a third party must perform in order to recover the plaintext from the sender's message. In the present invention, a third party may, under proper circumstances, gain access to a communication between the sender and the receiver. The third party may be anyone who has a legitimate need to gain access to such communications (e.g., employers, law enforcement agencies, etc.). Proper authority may come from an employment agreement or an order of a court. It may also be required that the third party seek the necessary items to recover the communication between a sender and a receiver from one or more authorizing entities.

The third party is given a secret family key $x_f$, which corresponds to the public family key $Y_f$, held by both the sender and the receiver. The third party is also given data based on the identification numbers of all of the valid senders.

The third party intercepts the datums U, V, and the ciphertext sent by the sender to the receiver. The third party uses the secret family key $x_f$, the intercepted datum U, and a first commutative one-way function block to form a first temporary key (e.g., $U**x_f$). The first commutative one-way function block is identical to the third commutative one-way function blocks used by the sender and the receiver (i.e., the commutative one-way function blocks that use the public family key $Y_f$).

The first temporary key is used as the key for a first symmetric-key decryptor to decrypt the intercepted datum V. The first symmetric-key decryptor must be able to undo or reverse the result of the second symmetric-key encryptor used by the sender. The result of the decryption is the sender's identification number and the sender's encrypted session key.

The sender's identification number and the sender's encrypted session key are separated into two component parts. The first component part is the sender's identification number ($ID_i$) while the second component part is the sender's encrypted session key. The sender's identification number is used as an address to a memory unit. The output of the memory unit $x_i$ is used with the intercepted datum U and a second commutative one-way function block to form a second temporary key (e.g., $Ux_i$). The $x_i$ is mathematically related to the public device unique key $Y_i$ (i.e., $Y_i=gx_i$) so that the third part may recover the sender's session key.

The second temporary key is used with a second symmetric-key decryptor to decrypt the bits based on the sender's encrypted session key in order to recover the sender's session key. The second symmetric-key decryptor must be able to undo or reverse the result of the sender's first symmetric-key encryptor.

With the session key sk and a third symmetric-key decryptor, the third party decrypts the intercepted ciphertext message in order to recover the sender's plaintext message. The third symmetric-key decryptor must be able to undo or reverse the result of the sender's third symmetric-key encryptor.

Figure 6:
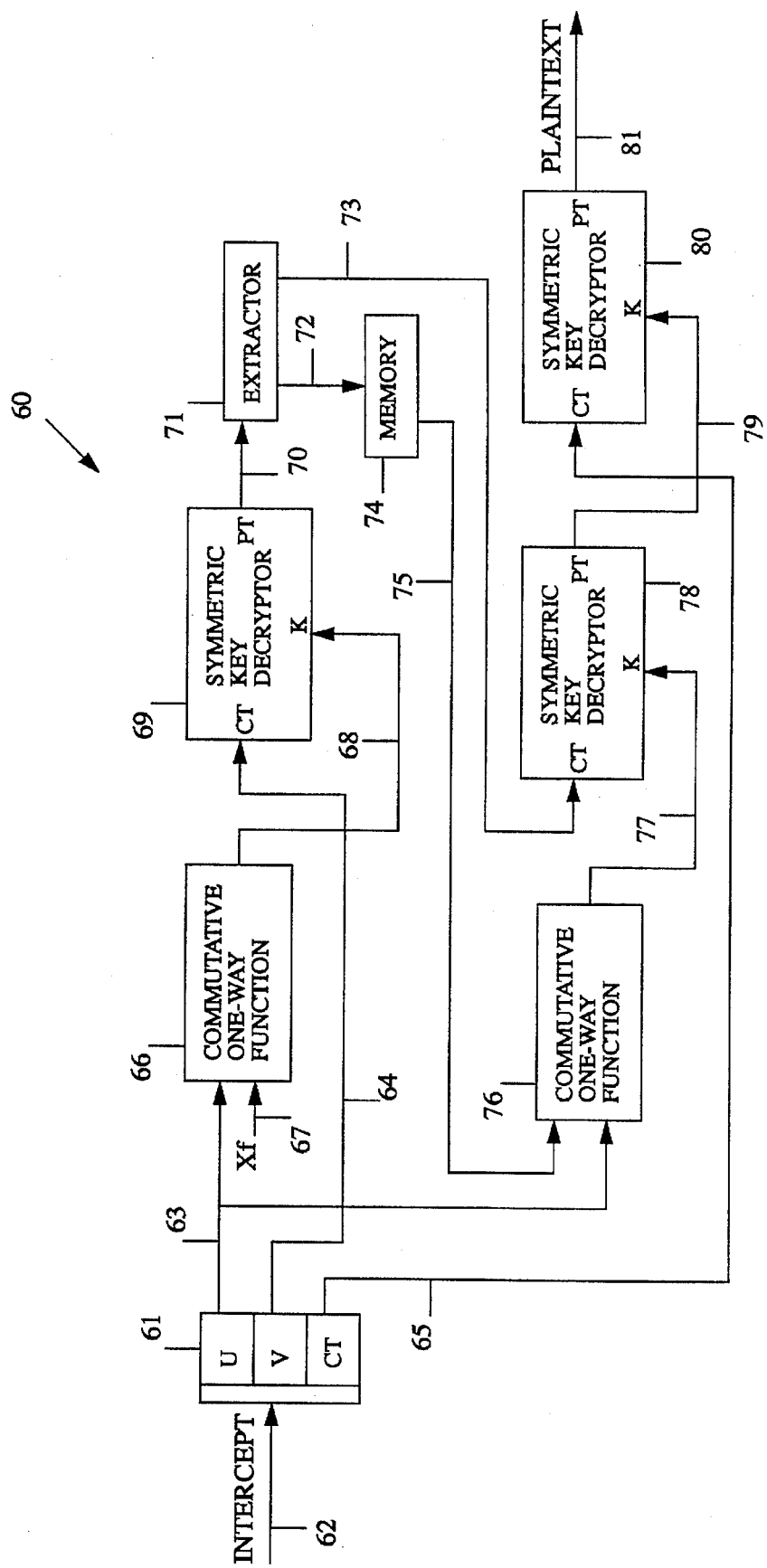
FIG. 6 is a schematic of a device used by the third party.

FIG. 6 is a schematic of a device 60 that the third party may use to implement the method illustrated in FIG. 5.

A register 61 intercepts datums U, V, and the ciphertext transmitted by the sender via an input 62. The register 61 has a first output 63 for transmitting the intercepted datum U, a second output 64 for transmitting the intercepted datum V, and a third output 65 for transmitting the intercepted ciphertext.

A first commutative one-way function block 66, having a first input connected to the first output 63 of the register 61 for receiving the intercepted datum U, having a second input 67 for receiving the secret family key $x_f$, and having an output 68, forms the third party's first temporary key. The third party's first commutative one-way function block 66 must be identical to the third commutative one-way function block 14 of FIG. 2 (i.e., a multiplier or an exponentiator). In the preferred embodiment, the sender's third commutative one-way function block 14 is an exponentiator. Therefore, $U**x_f$ appears at the output 68 of the third party's first commutative one-way function block 66.

A first symmetric-key decryptor 69, having a ciphertext input connected to the second output 64 of the register 61 for receiving the intercepted datum V, having a key input connected to the output 68 of the first commutative one-way function block 66 for receiving the third party's first temporary key as a key, and having a plaintext output 70, is used to decrypt the intercepted datum V (i.e., the combination of the sender's identification number and the sender's encrypted session key). The third party's first symmetric-key decryptor 69 must be able to undo or reverse the result of the sender's second symmetric-key encryptor 17 of FIG. 2.

An extractor 71, having an input connected to the output 70 of the first symmetric-key decryptor 69, having a first output 72 for transmitting bits ID based on the sender's identification number, and having a second output 73 for transmitting bits based on the sender's encrypted session key, separates the bits based on the sender's identification number from the bits based on the sender's encrypted session key.

A memory 74, having an input connected to the first output 72 of the extractor 71, and having an output 75, accepts the sender's identification number and transmits the secret unique key $x_i$ so that the third party may recover the sender's session key sk.

A second commutative one-way function block 76, having a first input connected to the first output 63 of the register 61 for receiving the intercepted datum U, having a second input connected to the output 75 of the memory 74 for receiving the secret unique key $x_i$ based on the sender's identification number $ID_i$, and having an output 77, forms the third party's second temporary key. The third party's second commutative one-way function block 76 must be identical to the sender's second commutative one-way function block 6 of FIG. 2 (i.e., a multiplier or an exponentiator). In the preferred embodiment, the sender's second commutative one-way function block 6 is an exponentiator. Therefore, $U**x_i$ appears at the output 77 of the third party's second commutative one-way function block 76.

A second symmetric-key decryptor 78, having a first input connected to the second output 73 of the extractor 71 for receiving bits based on the sender's encrypted session key as ciphertext, having a second input connected to the output 77 of the second commutative one-way function block 76 for receiving the second temporary key as key, and having a plaintext output 79, decrypts the bit based on the sender's encrypted session key in order to recover the sender's session key.

A third symmetric-key decryptor 80, having a first input connected to the third output 65 of the register 61 for receiving the intercepted ciphertext as ciphertext, having a second input connected to the output 79 of the second symmetric-key decryptor 78 for receiving the session key as key, and having a plaintext output 81, decrypts the intercepted ciphertext in order to recover the sender's plaintext message. The third party's third symmetric-key decryptor 80 must be able to undo or reverse the output 21 of the sender's third symmetric-key decryptor 19.

In an alternate embodiment of the present invention, several entities may exist. A first entity may hold a master key. The master key may be used to sign a public key of a second entity. The second entity may certify (i.e., sign) a public unique key $Y_i$. Escrow agents may hold parts of the secret unique key $x_i$ and may only divulge these parts under certain circumstances (e.g., when appropriate authority is demonstrated).

The following system-wide parameters may be used in the alternate embodiment of the present invention:

a) p, a prime number, preferably, 1024 bits long, where p is known by all users (i.e., escrow entities, the sender, the recipient, and the third party);

b) q, a prime divisor of p−1, preferably, 160 bits long, where q is known by all users;

c) g, an element of order q in GF(p), where g is known by all users;

d) $x_u$, a universal secret (i.e., master) key known only by the universal authority, where $x_u$ is, preferably, 160 bits long, and where $x_u$ is used to sign (authenticate) the public signature key of the escrow certification authority and the public family key;

e) $x_e$, a secret key known only by the escrow certification authority, where $x_e$ is, preferably, 160 bits long, and where $x_e$ is used to sign (authenticate) device unique public keys which are properly escrowed with escrow agents and the public family key;

f) $x_f$, a secret family key, where $x_f$ is, preferably, 160 bits long and known only by the third party, and where $x_f$ is used by the third party to decrypt an access field generated by the sender to recover the identification ($ID_i$) of a particular device of the present invention;

g) $Y_u$, the universal public key, where $Y_u=(g**x_u) \bmod p$, where $Y_u$ is known by all users, and where $Y_u$ is used to verify a signature on the escrow certification public key and public family key;

h) $Y_e$, the escrow certifier's public key, where $Y_e=(g**x_e) \bmod p$, and where $Y_e$ is used to verify a signature on the device unique public key, device unique identification, and the public family key;

i) $Y_f$, the public family key, where $Y_f=(g**x_f) \bmod p$, where $Y_f$ is used in the process of encrypting the sender's access field;

j) Tag, an identification field in the sender's access field, where the Tag is, preferably, 32 bits long, where the Tag is used to identify the holder of the family key, the holder of the escrow keys, and the length of the sender's access field, where a portion of the Tag, preferably, the first 16 bits, would identify the holders of the keys while another portion of the Tag, preferably, the last sixteen bits, identify the length of the sender's access field;

k) $k_e$, a secret random number, where $k_e$ is used to generate the escrow certifier's signature, preferably 160 bits long, known only by the holder of the universal secret (master) key;

l) $r_e$, half of an escrow certifier's signature, where $r_e$=( $(g^{**}k_e)$mod p)mod q, where $r_e$ is generated by the holder of the universal secret (master) key and where $r_e$ is half of the escrow certifier's signature; and m) $s_e$, the other half of the escrow certifier's signature, where $s_e = (k_e - 1) \ (SHA(Y_f||Tag||Y_e)+(x_u) \ (r_e))$mod q, and where $s_e$ is generated by the holder of the universal secret key.

The following information is unique to each user of the alternate embodiment of the present invention:

a) $ID_i$, an identification number for device i, where $ID_i$ is, preferably, 64 bits long, where a portion of $ID_i$, preferably the first 24 bits, are used to identify the escrow agents and the family key, and where another portion of $ID_i$, preferably the last 40 bits, are used to store the serial number of device i;

b) $x_{i1}$, a secret unique key for device i, where $x_{i1}$ is, preferably, 160 bits long, and where $x_{i1}$ is held by the first escrow agent;

c) $x_{i2}$, a secret unique key for device i, where $x_{i2}$ is, preferably, 160 bits long, and where $x_{i2}$ is held by the second escrow agent;

d) $Y_i$, a device unique public key for device i, where $Y_i = (g^{**} \ (x_{i1}+x_{i2}) \ \text{mod} \ q)$mod p, and where $Y_i$ is known by all users;

e) $k_i$, a secret random number for device i, generated by the escrow certifier, where $k_i$ is, preferably, 160 bits long, and where $k_i$ is known only by the escrow certification authority;

f) $r_i$, one-half of the signature for device i, where $r_i$=( $(g^{**}k_i)$mod p) mod q, and where $r_i$ is, preferably, created by the escrow certifier; and g) $s_i$, the other half of the signature for device i, where $s_i = (k_i-1) \ (SHA \ (Y_f||Tag||ID_i||Y_i)+(x_e) \ (r_i))$ mod q, and where $s_i$ is, preferably, created by the escrow certifier.

The term "SHA" refers to a secure hash algorithm. Preferably, SHA follows the secure hash standard adopted by the U.S. Government and published in Federal Information Processing Standards Publication 180 (FIPS-180). FIPS-180 is incorporated by reference into the specification of the present invention.

Although it is preferred that the values Tag, $Y_e$, $Y_f$, $r_e$, $s_e$, $ID_i$, $Y_i$, $r_i$, and $s_i$ be stored in the device, it is not necessary. These values may be transmitted to the device prior to the creation of the sender's ciphertext and access field. If these values are transmitted to the device instead of stored in the device, the two signatures (i.e., ($r_e$, $s_e$) and ($r_i$, $s_i$)) must be verified prior to creating the sender's ciphertext and access field.

FIG. 7 is a flow chart of the steps that a sender must perform to send an encrypted message and an access field to a recipient. These steps are as follows:

(a) the sender knows p, q, g, $Y_i$, $Y_f$, f, h, $r_i$, $s_i$, first pad, second pad, and Tag;

(b) the sender and recipient know the session key (sk), where sk may be agreed upon by, or given to, the sender and recipient, and where sk is, preferably, 80 bits long;

(c) generate a random number, preferably, 64 bits long, and designate it as the initialization vector (IV);

(d) form m=f(IV,sk), where the function f maps IV and sk into an exponent (i.e., m), where m is, preferably, 160 bits long;

(e) form U=$g^m$ mod p, where U is, preferably, 1024 bits long;

(f) form t=h$((Y_i^{**}m)$mod p), where t is the temporary device unique key, where the function h maps a number into a key (i.e., t), where t is, preferably, 80 bits long;

(g) form w=h$((Y_f^{**}m)$mod p), where w is a temporary family key, and where w is, preferably, 80 bits long;

(h) form V=$E_w(IV,(ID_i||Y_i||r_i||s_i||E_t(sk)||\text{first pad}))$, where the function E, initialized by IV, encrypts the message in the nested patens using the key in the subscript (i.e., w), where $E_t(sk)$ means to encrypt sk using the key t, where any secure symmetric-key encryption device may be used to perform the function E, where, preferably, V is 1536 bits long and the first pad is 48 zeros;

(i) form z–IV||second pad, where the second pad is, preferably, 16 zeros;

(j) form sk*=$E_z(sk)$;

(k) form ct=$E_{sk*}(IV, pt)$; where pt is the plaintext message to be encrypted, and where ct is the resulting ciphertext (or encrypted message) to be transmitted;

(l) form the access field (i.e., Tag||IV||U||V), where the access field is, preferably, 2656 bits long; and (m) transmit the ciphertext concatenated to the access field (i.e., ct||access field) to the receiver.

Figure 8:
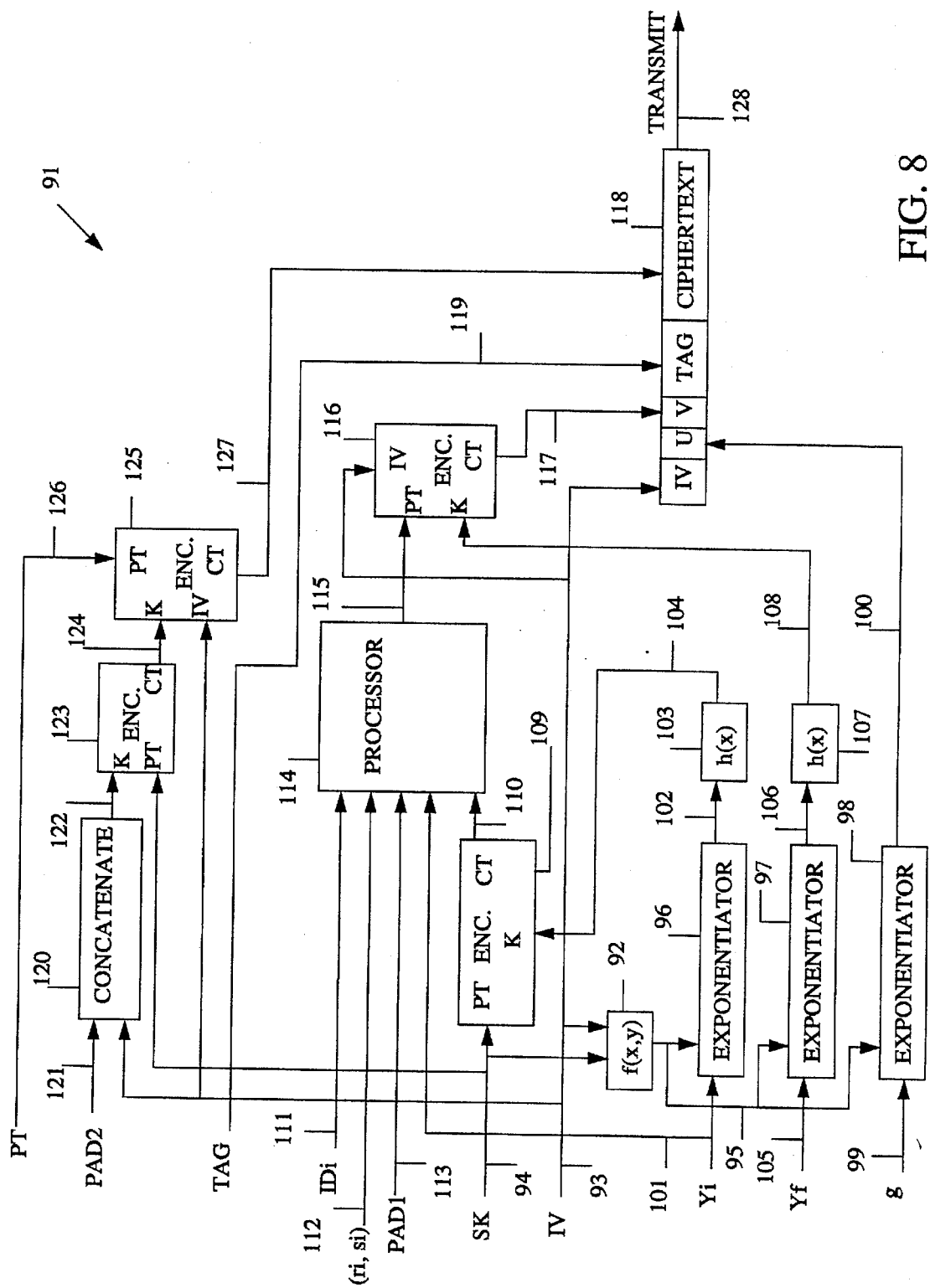
FIG. 8 is a schematic of a device used by the sender in the alternate embodiment of the present invention.

FIG. 8 is a schematic of a public-key escrowed encryption system 91 that a sender may use to send ct||access field to a recipient. The sender is given p, q, f, h, g, $Y_i$, $Y_f$, IV, $r_i$, $s_i$, $ID_i$, Tag, a first pad, and a second pad. The sender may be given sk, or the sender and recipient may agree on an sk.

IV and sk are transmitted to a function block 92 via a first input 93 and a second input 94, respectively. Function block 92 maps the sk and the IV to an exponent m. In the preferred embodiment, sk is 80 bits long, IV is 64 bits long, and m is 160 bits long. Any function that uniquely maps a pair of inputs to an output would satisfy the requirements of the function block 92. IV also forms a portion of the access field.

The output 95 of the function block 92 is connected to one of the two inputs of a first exponentiator 96, a second exponentiator 97, and a third exponentiator 98. Each of these exponentiators 96, 97, 98 may be realized with a conventional multiplier and a scratch-pad memory device because exponentiation may be achieved through a series of multiplications. For example, $a^{23}=(((((( a^2)^2)a)^2)a)^2)a)$.

An element g of order q in GF(p) is transmitted via a second input 99 of the third exponentiator 98. The output 100 of the third exponentiator 98 (i.e., U=$g^m$ mod p) forms the U portion of the access field.

$Y_i$, the device unique public-key for device i, is transmitted to the first exponentiator 96 via a second input 101. The output 102 of the first exponentiator 96 (i.e., $(Y_i^{}m)$mod p) is connected to a first hash function block 103. The first hash function block 103 maps the output 102 of the first exponentiator 96 to a number (i.e., t=h$((Y_i^{}m)$ mod p)), preferably 80 bits long, which appears at the output 104 of the first hash function block 103.

$Y_f$, the public family key for device i, is transmitted to the second exponentiator 97 via a second input 105. The output 106 of the second exponentiator 97 (i.e., $(Y_f^{}m)$mod p) is connected to a second hash function block 107. The second hash function block 107 maps the output 106 of the second exponentiator 97 to a number (i.e., $w=h((Y_f{}m) \bmod p)$), preferably 80 bits long, that appears at the output 108 of the second hash function block 107.

A first encryptor 109 is used to encrypt the session key sk. The first encryptor 109 may be realized by any secure symmetric-key encryption device. Such a device is generally known by those skilled in the art. The first encryptor 109 has a first input 94 for receiving sk as plaintext, a second input connected to the output 104 of the first hash function block 103 (i.e., t) as key, and a ciphertext output 110 for transmitting the encrypted version of sk (i.e., $E_t(sk)$).

$Y_i$, $E_t(sk)$, $ID_i$, $(r_i, s_i)$, and a first pad, preferably 48 zeros, are transmitted to a processing block 114 via inputs 101, 110, 111, 112, and 113, respectively. The processing block 114 takes in various inputs of varying lengths, concatenates the inputs into one string of bits, and outputs a uniform block-size portion of the string. For example, the processing block 114 might have five inputs with the following bit lengths respectively, 64, 128, 192, 256, and 320. If the uniform block-size output where to be 64 bits then the processing block would concatenate these five inputs together and output fifteen 64-bit blocks. The processing block 114 may be realized with a commercially available microprocessor. The output 115 of the multiplexer block 114 transmits uniform block-size portions of the concatenated inputs 101, 110, 111, 112, and 113 in serial fashion.

The output 115 of the processor block 114 is encrypted by a second encryption block 116. The second encryption block 116 is essentially identical to the first encryption block 109 except for an extra input that enables the second encryption block 116 to be initialized. The initialization input of the second encryption block 116 is connected to the second input 93 of the function block 92. A plaintext input to the second encryption block 116 is connected to the output 115 of the processor block 114. A key input to the second encryption block 116 is connected to the output 108 of the second hash function block 107. The ciphertext output 117 of the second encryption block 116 is connected to an output register 118 that is used to store ct||access field.

A "Tag," preferably 32 bits long, forms the Tag portion of the access field. The Tag is transmitted to the output register 118 via input 119.

IV and a second pad, preferably 16 zeros, are transmitted to a concatenation block 120 via inputs 3 and 121, respectively. The concatenation block 120, which may be realized with a shift-register, concatenates a pad of zeros to the initialization vector IV. The output 122 of the concatenation block 120 forms z.

A third encryptor 123 is used to encrypt the session key 94 using the output 122 of the concatenation block 120 as the key. The third encryptor 123 is identical to the first encryptor 109. The third encryptor 123 has a first input for receiving the output 122 of the concatenation block 120 as the key, a second input 94 for receiving sk as plaintext, and an output 124 for transmitting the encrypted version of sk (i.e., $sk^*=E_z(sk)$) as ciphertext.

A fourth encryptor 125 is used to encrypt the intended plaintext message pt. The fourth encryptor 125 may or may not be identical to the second encryptor 116. The initialization input of the fourth encryption block 125 is connected to the second input 93 of the function block 92. A plaintext input 126 receives the sender's plaintext message to be encrypted. A key input to the fourth encryption block 125 is connected to the output 124 of the third encryption block 123. The ciphertext output 127 of the fourth encryption block 125, which is the encrypted version of the plaintext message (i.e., $ct=E_{sk^*}(IV, pt)$), is connect to the output register 118.

The access field (i.e., IV, U, V, Tag) and ct are transmitted to the receiver via an output 128 of the output register 118.

Figure 9:
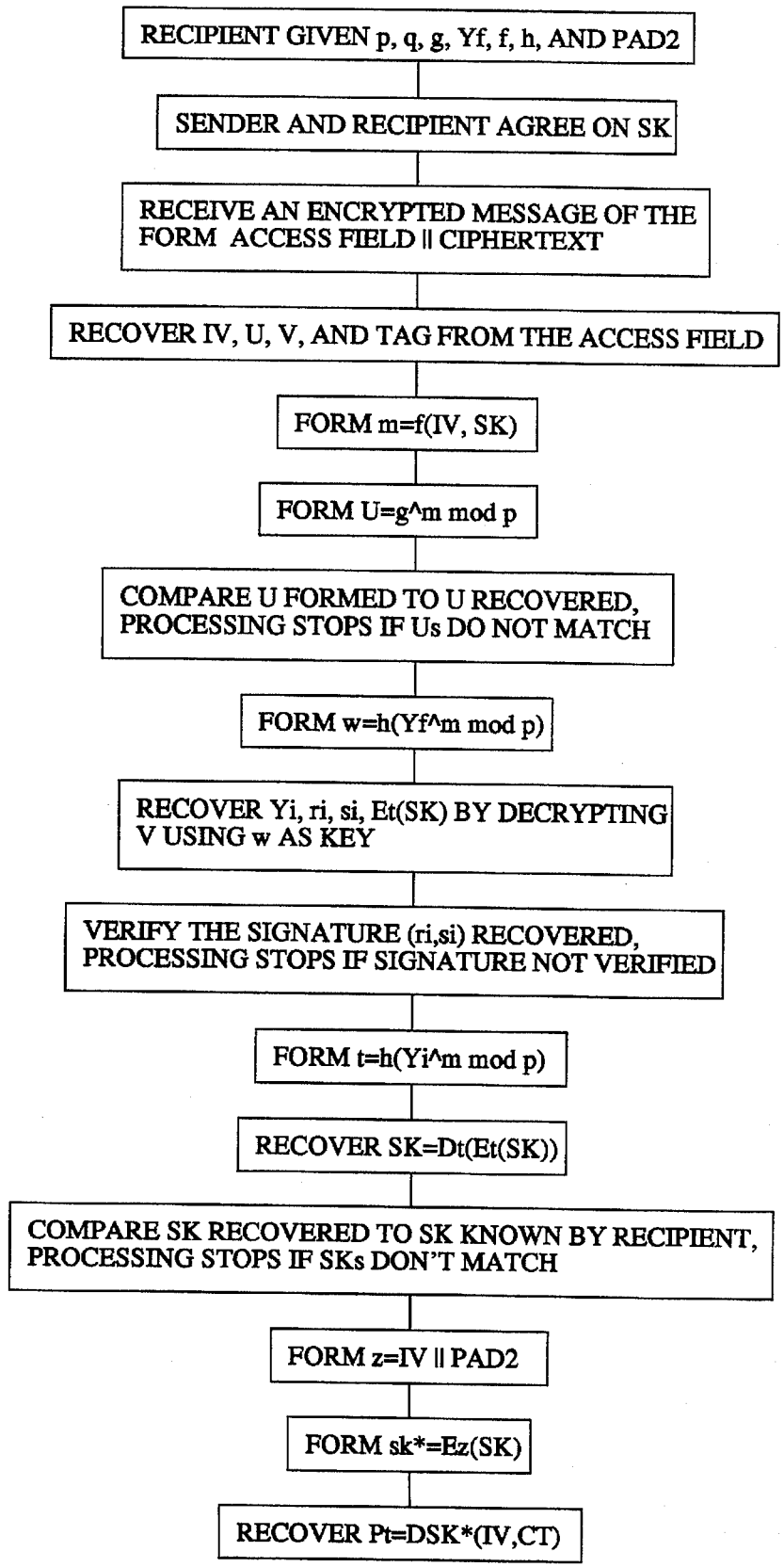
FIG. 9 is a flow chart of the steps that a recipient performs in the alternate embodiment of the present invention.

FIG. 9 is a flow chart of the steps that a receiver must perform to recover the plaintext from the sender's ciphertext and access field. These steps are as follows:

(a) the recipient knows p, q, g, $Y_f$, f, h, a first pad, a second pad, and sk used by the sender;

(b) receive ct||access field from the sender;

(c) recover Tag, IV, U, and V from the access field;

(d) form $m=f(IV, sk)$, where m is, preferably, 160 bits long;

(e) form $U=g^m \bmod p$, where U is, preferably, 1024 bits long;

(f) check to see if the result of step (e) matches the U recovered from the access field in step (c), processing of the message stops if they do not match;

(g) form $w=h((Y_f{**}m) \bmod p)$, where w is a temporary family key, and where w is, preferably, 80 bits long;

(h) recover $ID_i$, $Y_i$, $r_i$, $s_i$, and $E_t(sk)$ from the access field by decrypting V with w and IV (i.e., $D_w(IV, V)$), where any secure decryption device that can perform the inverse of the encryption device used by the sender to create V can be used to perform the decryption;

(i) verify the $(r_i, s_i)$ recovered in step (h) using the Tag recovered in step (c), the $ID_i$ and $Y_i$ recovered in step (h), and the verification method of U.S. Pat. No. 5,231,668, processing of the message stops if the signature is not verified;

(j) form $t=h((Y_i{**}m) \bmod p)$, using $Y_i$ recovered in step (h) and verified in step (i);

(k) recover sk by decrypting $E_t(sk)$ recovered in step (h) (i.e., $sk=D_t(E_t(sk))$);

(l) compare sk recovered in step (k) to sk known by the recipient, processing of the message stops if they do not match;

(m) form z=IV||second pad, where the pad is, preferably, 16 zeros;

(n) form $sk^*=E_z(sk)$; and (o) decrypt the ct received using sk* (i.e., $pt=D_{sk^*}(IV, ct)$), to recover the plaintext message (pt).

Figure 10:
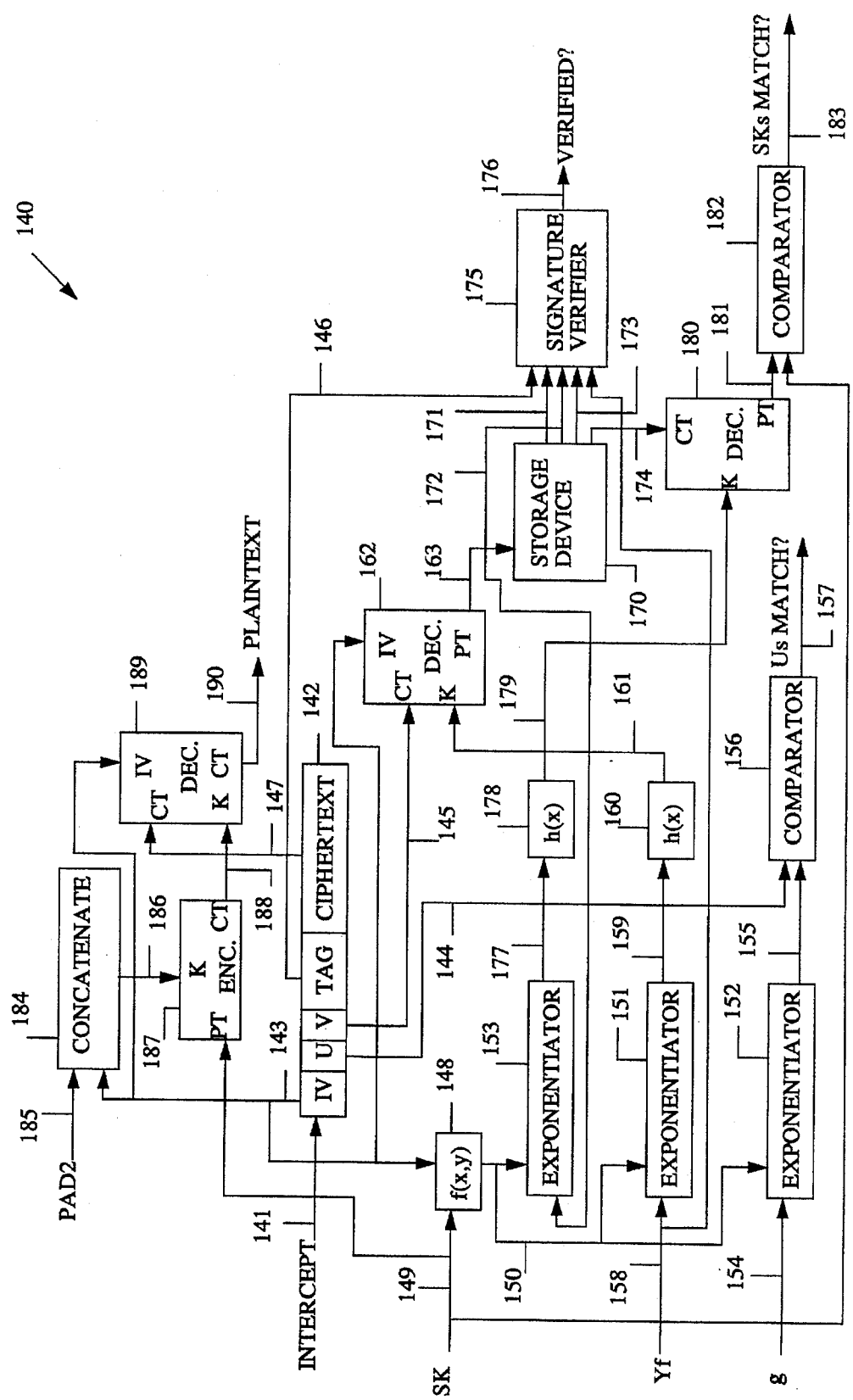
FIG. 10 is a schematic of a device used by the recipient in the alternate embodiment of the present invention.

FIG. 10 is a schematic of a public-key escrowed encryption system 140 that a receiver of an access field||ct from a sender using the device 91 of FIG. 8 may use to recover the sender's plaintext message. The receiver is given p, q, f, h, g, $Y_f$, and a first pad. The receiver may be given sk, or the sender and receiver may agree on an sk.

The access field||ct from the sender is received by the receiver via input 141 to a serial-in parallel-out first shift-register 142. The first shift-register 142 transmits the access field (i.e., IV, U, V, Tag) and ct via outputs 143, 144, 145, 146, and 147, respectively.

IV and sk are transmitted to a function block 148 via a first input connected to the first output 143 of said first shift-register 142 and a second input 149, respectively. The function block 148 maps the sk and the IV to an exponent m. In the preferred embodiment, sk is 80 bits long, IV is 64 bits long, and m is 160 bits long. Any function that uniquely maps a pair of inputs to an output would satisfy the requirements of the function block 148.

The output 150 of the function block 148 is connected to each of the first inputs of a first exponentiator 151, a second exponentiator 152, and a third exponentiator 153. Each of these exponentiators 151, 152, 153 may be realized with a conventional multiplier and scratch-pad memory device because exponentiation may be achieved through a series of multiplications. For example, $a^{23}=((((((a^2)^2)a)^2)a)^2)a)$.

An element g of order q in GF(p) is transmitted to the second exponentiator 152 via a second input 154. The output 155 of the second exponentiator 152 (i.e., $U=g^m \bmod p$) is transmitted to the first input of a first comparator 156 so that the U generated by the second exponentiator 152 may be compared to the U portion of the access field received.

The second output 144 of the first shift-register 142 is connected to the second input of the first comparator 156. The output 157 of the first comparator 156 indicates whether or not the U generated matches the U received. If they match, processing proceeds. Otherwise, processing is halted.

$Y_f$, the public "family" key for device i, is transmitted to the first exponentiator 151 via a second input 158. The output 159 of the first exponentiator 151 (i.e., $(Y_fm) \bmod p$) is connected to a first hash function block 160. The first hash function block 160 maps the output 159 of the first exponentiator 151 to a number (i.e., $w=h((Y_fm) \bmod p)$), preferably 80 bits long, that appears at the output 161 of the first hash function block 160.

A first decryption block 162 is used to decrypt the V portion of the access field received (i.e., $V=E_w(IV, (ID_i||Y_i||r_i||s_i||E_f(sk)||pad1))$). V is decrypted in order to recover the device identification ($ID_i$), the public key of the sender ($Y_i$), the signature of the sender ($r_i$, $s_i$), and the encrypted version of the session key ($E_f(sk)$). The first decryption block 162 may be realized by any secure symmetric-key decryption device that is able to decrypt messages encrypted by the encryption blocks used by the sender that have an initialization input. Such a device is generally known by those skilled in the art.

The initialization input of the first encryption block 162 is connected to the first output 143 of the shift-register 142. The ciphertext input of the first decryption block 162 is connected to the third output 145 of the shift-register 142. The key input of the first decryption block 162 is connected to the output 161 of the first hash function block 160. The output 163 of the first decryption block 162 is connected to a storage device 170.

The storage device 170 stores the decrypted portions of V (i.e., the $ID_i$ of the sender, $Y_i$ of the sender, the signature ($r_i,s_i$) of the sender, and the encrypted version of the session key ($E_f(sk)$) sent by the sender). The storage device 170 transmits the $ID_i$, $Y_i$, ($r_i,s_i$), and ($E_f(sk)$), respectively, along the outputs 171, 172, 173, and 174 of the storage device 170.

A signature verification block 175 is used to verify the signature transmitted by the sender (i.e., ($r_i,s_i$)). The fourth output 146 (i.e., TAG) of the first shift-register 142 is connected to the first input of the signature verification block 175. The first output 171 of the storage device 170 is connected to the second input of the signature verification block 175. The second output 172 of the storage device 170 is connected to the third input of the signature verification block 175. The third output 173 of the storage device 170 is connected to the fourth input of the signature verification block 175. $Y_f$, the public family key for device i, is transmitted to the fifth input of the signature verification block 182 via input 158. The signature verification block 175 performs a verification method as disclosed in U.S. Pat. No. 5,231,668, entitled DIGITAL SIGNATURE ALGORITHM. U.S. Pat. No. 5,231,668 is hereby incorporated by reference into the specification of the present invention. The output 176 of the signature verification block 175 indicates whether or not the signature has been verified. If the signature is verified, processing continues. Otherwise, processing is halted.

$Y_i$, the device unique public key for device i which appears at the second output 172 of the storage device 170, is transmitted to the second input of the third exponentiator 153. The output 177 of the third exponentiator 153 (i.e., $(Y_im) \bmod p$) is connected to a second hash function block 178. The second hash function block 178 is identical to the first hash function block 160. A temporary device unique key (i.e., $t=h((Y_im) \bmod p)$) appears at the output 179 of the second hash function block 178.

A second decryption block 180 is used to decrypt the encrypted session key received from the sender (i.e., $E_t(sk)$) in order to recover the sender's session key. The second decryption block 180 is identical to the first decryption block 162 with the exception that the second decryption block 180 does not have an initialization input. The ciphertext input of the second decryption block 180 is connected to the fourth output 174 of the storage device 170 for accepting $E_t(sk)$. The key input of the second decryption block 180 is connected to the output 179 of the second hash function block 178. The sender's session key sk appears at the plaintext output 181 of the second decryption block 180.

A second comparator 182 is used to compare the sender's sk to the sk known by the receiver. The second comparator 182 is functionally equivalent to the first comparator 156. If the two session keys match, processing continues. Otherwise, processing is halted. The output 181 of the second decryption block 180 is connected to the first input of the second comparator 182. The sk input 149 is connected to the second input of the second comparator 182. The output 183 of the second comparator 182 indicates whether or not the sk known to the receiver matches the sender's sk.

A concatenator 184 is used to concatenate IV received from the sender with a pad, preferably 16 zeros. The concatenator 184 may be realized with a serial-in-parallel-out shift-register. IV is transmitted to the first input of the concatenator 184 via the first output 143 of the shift-register 142. The pad is transmitted to the concatenator 184 via the second input 185 of the concatenator 184. The result (i.e., z=IV||pad) appears at the output 186 of the concatenator 184. The output 186 of the concatenator 184 is used as the key to encrypt the session key sk. The resulting encrypted session key sk* is used by the receiver to decrypt the sender's ciphertext message.

An encryption block 187 is used to encrypt the session key (sk) known by the receiver. The encryption block 187 is identical to the encryption block used by the sender to form the sender's working key (sk*). The encryption block 187 has a plaintext input for receiving the sk known by the receiver via input 149, a key input for receiving the key from the output 186 of the concatenator 184, and a ciphertext output 188 for transmitting the encrypted session key (i.e., sk*=$E_z(sk)$).

A third decryption block 189 must be able to decrypt the ciphertext message sent by the sender to the receiver in order to recover the sender's plaintext message. That is, the third decryption block 189 must be able to reverse or undo the encryption performed by the fourth encryption block 125 of FIG. 8. The initialization input of the third decryption block 189 is connected to the first output 143 of the shift-register 142. The ciphertext input of the third decryption block 189 is connected to the fifth output 147 (i.e., the sender's ciphertext) of the shift-register 142. The key input of the third decryption block 189 is connected to the output 188 of the encryption block 187. The sender's plaintext message appears at the output 190 of the third decryption block 189.

Figure 11:
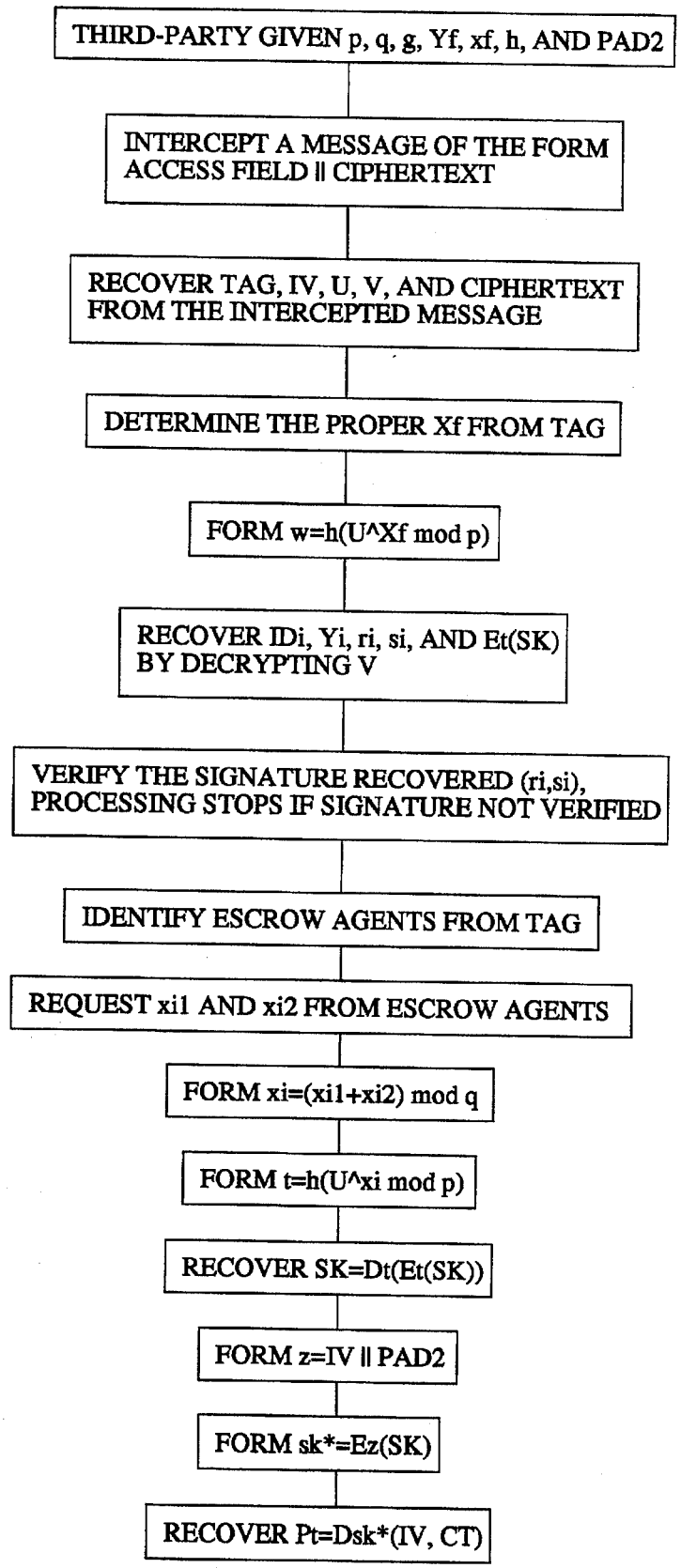
FIG. 11 is a flow chart of the steps that a third party performs in the alternate embodiment of the present invention.

FIG. 11 is a flow chart of the steps that a third party, under proper authority, must perform to recover the sender's plaintext message. These steps are as follows:

(a) the third party knows p, q, g, $Y_f$, $x_f$, h, and D;
(b) intercept the sender's ctl|access field;
(c) recover Tag, IV, V, and U from the access field;
(d) identify the secret family key, $x_f$, from the Tag;
(e) form w=h((U**$x_f$) mod p);
(f) recover $ID_i$, $Y_i$, $r_i$, $s_i$, and $E_t$(sk) from V by decrypting V using w and IV (i.e., $D_w$(IV, V));
(g) verify the ($r_i$, $s_i$) recovered in step (e) using the method of U.S. Pat. No. 5,231,688;
(h) identify the escrow agents from the Tag;
(i) request $x_{i1}$ from the first escrow agent and $x_{i2}$ from the second escrow agent using $ID_i$;
(j) form $x_i$=($x_{i1}$+$x_{i2}$)mod q;
(k) form t=h((U**$x_i$)mod p);
(l) recover sk by decrypting $E_t$(sk) using t formed in step (k) (i.e., $D_t$)($E_t$(sk)));
(m) form z=IV||second pad, where the second pad is, preferably, 16 zeros;
(n) form sk*=$E_z$(sk); and
(o) recover the plaintext message by decrypting ct using sk* (i.e., $D_{sk*}$(IV, ct)).

In a second alternate embodiment of the present invention, U and ID may be given to the escrow agents. Therefore, instead of requesting $x_{i1}$ and $x_{i2}$ from the escrow agents, the third party may request ((U$x_{i1}$) mod p) from the first escrow agent and ((U$x_{i2}$) mod p) from the second escrow agent. Instead of forming $x_i$=($x_{i1}$+$x_{i2}$)mod q and t=h((U$x_i$)mod p), the third party would form t=h((U$x_{i1}$)(U**$x_{i2}$)mod p). Processing would then continue as listed above. In the second alternate embodiment, the escrow agent never reveals the escrowed secret that is being held. Instead, the escrow agent would reveal part of the temporary device unique key. This allows for a more secure escrow system that may be used to incorporate time limits on the use of the temporary device unique key.

Figure 12:
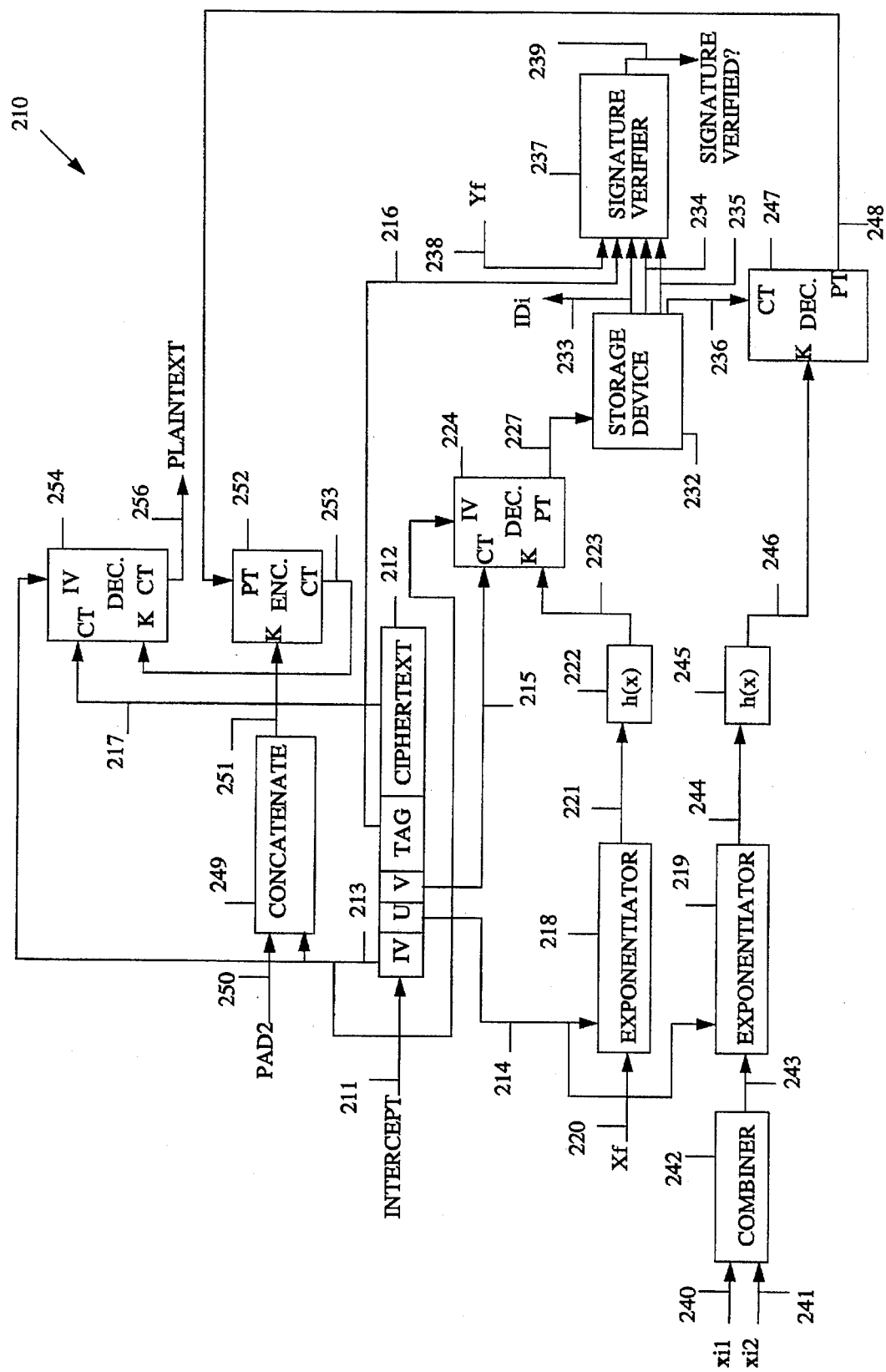
FIG. 12 is a schematic of a device used by the third party in the alternate embodiment of the present invention.

FIG. 12 is a schematic of a public-key escrowed encryption system 210 that a third party may use to recover the plaintext of the sender's message if the sender used the device 91 of FIG. 8 to generate the ciphertext.

The third party is initially given p, q, h, g, $Y_f$, $x_f$, and a second pad. To recover the plaintext, the third party may request $x_{i1}$ and $x_{i2}$ from the escrow agents that may be holding these items.

The access field||ct transmitted from the sender to the receiver is intercepted by the third party via input 211 and transmitted to a serial-in parallel-out shift-register 212. The shift-register 212 receives a single serial transmission consisting of the access field||ct (i.e., IV, U, V, Tag, and ct), separates these items, and transmits these items in parallel fashion via outputs 213, 214, 215, 216, and 217, respectively.

The U output 214 of the shift-register 212 is connected to the first input of a first exponentiator 218 and the first input of a second exponentiator 219. Each of these exponentiators 218, 219 may be realized with a conventional multiplier and a scratch-pad memory device because exponentiation may be achieved through a series of multiplications. For example, $a^{23}$=((((((($a^2$)$^2$)a)$^2$)a)$^2$)a).

A secret family key $x_f$ is transmitted to the second input 220 of the first exponentiator 218. The output 221 of the first exponentiator 218 (i.e., (U$x_f$) mod p) is connected to a first hash function block 222. The first hash function block 222 maps the output 221 of the first exponentiator 218 to a number (i.e., w=h((U$x_f$) mod p)), preferably 80 bits long, that appears at the output 223 of the first hash function block 222.

A first decryption block 224 is used to decrypt V from the access field (i.e., V=$E_w$(IV,($ID_i$||$Y_i$||$r_i$||$s_i$||$E_t$(IV, sk) ||pad1)). V is decrypted in order to recover the device identification ($ID_i$), the public key of the sender ($Y_i$), the signature of the sender ($r_i$, $s_i$), and the encrypted version of the session key ($E_t$(sk)). The first decryption block 224 may be realized by any secure symmetric-key decryption device having an initialization input that is able to decrypt messages encrypted by the encryption blocks used by the sender which also have an initialization input. Such a device is generally known by those skilled in the art.

The initialization input of the first decryption block 224 is connected to the first output 213 of the shift-register 212. The ciphertext input of the first decryption block 224 is connected to the third output 215 (i.e., V) of the shift-register 212. The key input of the first decryption block 224 is connected to the output 223 of the first hash function block 222. The plaintext output 227 of the first decryption block 224 is connected to a storage device 232.

The storage device 232 stores the decrypted portions of V (i.e., the $ID_i$ of the sender, $Y_i$ of the sender, the signature ($r_i$,$s_i$) of the sender, and the encrypted version of the session key ($E_t$(sk)) sent by the sender). The storage device 232 transmits the $ID_i$, $Y_i$, ($r_i$, $s_i$), and ($E_t$(sk)), respectively, along the outputs 233, 234, 235, and 236 of the storage device 232. The $ID_i$ is used by the third party to determine if the message transmitted from the sender to the receiver is of any interest to the third party. If so, processing continues. Otherwise, processing is halted.

A signature verification block 237 is used to verify the signature transmitted by the sender (i.e., ($r_i$,$s_i$)). $Y_f$, the public family key for device i, is transmitted to the first input of the signature verification block 237 via input 238. The TAG output 216 of the shift-register 212 is connected to the second input of the signature verification block 237. The first output 233 of the storage device 232 is connected to the third input of the signature verification block 237. The second output 234 of the storage device 232 is connected to the fourth input of the signature verification block 237. The third output 235 of the storage device 232 is connected to the fifth input of the signature verification block 237.

The signature verification block 237 performs the verification method as disclosed in U.S. Pat. No. 5,231,668, entitled DIGITAL SIGNATURE ALGORITHM. The output 239 of the signature verification block 237 indicates whether or not the signature has been verified. If the signature is verified, processing continues. Otherwise, processing is halted.

After determining the $ID_i$ of the sender, the third party asks each escrow agent to provide a copy of their portion of the secret unique key for the sender's device. For a system using two escrow agents, the two portions of the secret unique key for the sender's device (i.e., $x_{i1}$, $x_{i2}$) are transmitted, respectively, via a first input 240 and a second input 241 of a combiner block 242. The present invention is not limited to having two escrow agents. Any number of escrow agents and escrow schemes may be used. The combiner block 242 combines these two portions of the sender's secret unique key and provides the combination at the output 243 of the combiner block 242 (e.g., ($x_{i1}$+$x_{i2}$) mod q). The combiner block 242 may be realized using commercially available exclusive-or gates.

The output 243 of the combiner block 242 is connected to the second input of the second exponentiator 219. The first input of the second exponentiator 219 is connected to the U output 214 of the shift-register 212. The second exponentiator 219 is identical to the first exponentiator 218.

The output 244 of the second exponentiator 219 (i.e., $(U^{**}((x_{i1}+x_{i2}) \bmod q) \bmod p)$ is connected to a second hash function block 245. The second hash function block 245 is identical to the first hash function block 222. The second hash function block 245 produces a number (i.e., t), preferably 80 bits long, that appears at the output 246 of the second hash function block 245.

A second decryption block 247 is used to recover the sender's session key. The second decryption block 247 is essentially identical to the first decryption block 224. The second decryption block 247 does not have an initialization input. The ciphertext input of the second decryption block 247 is connected to the fourth output 236 of the storage device 232. The key input of the second decryption block 247 is connected to the output 246 of the second hash function block 245. The sender's session key appears at the plaintext output 248 of the second decryption block 247.

A concatenator 249 is used to concatenate IV received from the sender with a pad, preferably 16 zeros. The concatenator 249 may be realized with a serial-in-parallel-out shift-register. The IV output 213 of the shift-register 212 is connected to the first input of the concatenator 249. The pad is provided via the second input 250 to the concatenator 249. The result (i.e., z=IV||pad) appears at the output 251 of the concatenator 249. The result is used as the key to encrypt the sender's session key recovered by the second decryption block 247. The encrypted session key (sk*) was used by the sender to encrypt the plaintext message and will be used by the receiver to recover the sender's plaintext.

An encryption block 252 is used to encrypt the sender's session key which was recovered by the second decryptor 247. The encryption block 252 is identical to the encryptor used by the sender to form the encrypted version of the sender's session key (i.e., sk*). The encryption block 252 has a plaintext input connected to the plaintext output 248 of the second decryption block 247, a key input connected to the output 251 of the concatenator 249, and a ciphertext output 253 for transmitting the encrypted session key (i.e., $sk^*=E_z(sk)$).

A third decryption block 254 is used to decrypt the ciphertext intercepted from the sender and, therefore, recover the sender's plaintext message. The third decryption block 254 is identical to the first decryption block 224. The third decrypt ion block 254 has an initialization input connected to the first output 213 of the shift-register 212, a ciphertext input connected to the fifth output 217 (i.e., the sender's ciphertext message) of the shift-register 212, and a plaintext output 256 at which appears the sender's plaintext message (i.e., $pt=E_{sk^*}(IV,ct)$).

What is claimed is:

1. A method of generating and using a public-key law enforcement access field, where a sender and a receiver agree on a session key, comprising the steps of:

(a) forming $g^{sk}$, where g is an element in a Galois Field, and where sk is the session key;

(b) forming a first temporary key;

(c) encrypting the session key using the first temporary key;

(d) combining an identification number with the result of step (c);

(e) forming a second temporary key;

(f) encrypting the result of step (d) using the second temporary key;

(g) encrypting a plaintext message using the session key;

(h) concatenating the results of steps (a), (f), and (g); and (i) transmitting the result of step (h) to the receiver.

2. The method of claim 1, wherein said step of forming a first temporary key comprises forming $Y_i^{**}sk$, where $Y_i$ is a public device unique key.

3. The method of claim 2, wherein said step of combining an identification number with the result of step (c) comprises concatenating the identification number to the result of step (c).

4. The method of claim 3, wherein said step of forming a second temporary key comprises forming $Y_f^{**}sk$, where $Y_f$ is a public family key.

5. A device for transmitting an encrypted message and an access field, where a sender and a receiver agree on a session key, comprising:

a) a first means for performing a commutative one-way function, having a first input for receiving an element g of a Galois Field, having a second input for receiving the session key, and having an output;

b) a second means for performing a commutative one-way function, having a first input for receiving a public device unique key $Y_i$, having a second input for receiving the session key, and having an output;

c) a third means for performing a commutative one-way function, having a first input for receiving a public family key $Y_f$, having a second input for receiving the session key, and having an output;

d) a first symmetric-key encryptor, having a plaintext input for receiving the session key, having a key input connected to the output of said second commutative one-way function means, and having a ciphertext output;

e) a combiner, having a first input for receiving an identification number, having a second input connected to the ciphertext output of said first symmetric-key encryptor, and having an output;

f) a second symmetric-key encryptor, having a plaintext input connected to the output of said combiner, having a key input connected to the output of said third commutative one-way function means, and having a ciphertext output;

g) a third symmetric-key encryptor, having a plaintext input for receiving the sender's plaintext message, having a key input for receiving the session key, and having a ciphertext output; and h) a shift-register for receiving and transmitting the output of said first commutative one-way function means, the ciphertext output of said second symmetric-key encryptor, and the ciphertext output of said third symmetric-key encryptor.

6. The device of claim 5, wherein the first, second, and third commutative one-way function means each comprise an exponentiator.

7. A method of recovering a plaintext message from a ciphertext message concatenated to an access field, where a sender and a receiver agree on a session key, and where the access field comprises $g^{sk}$, where g is an element in a Galois Field and sk is the session key, and an encrypted version of an identification number combined with an encrypted version of the session key, comprising the steps of:

(a) forming $g^{sk}$;

(b) comparing the result of step (a) to $g^{sk}$ received from the sender, processing is halted if the result of step (a) does not match the $g^{sk}$ received from the sender;

(c) forming a first temporary key;

(d) encrypting the session key using the first temporary key;

(e) forming a second temporary key;

(f) decrypting the encrypted version of an identification number combined with an encrypted version of the session key received from the sender using the second temporary key;

(g) extracting the encrypted session key from the result of step (f);

(h) comparing the result of step (d) to the result of step (g), processing is halted if the result of step (d) does not match the result of step (g); and (i) decrypting the ciphertext received from the sender using the session key in order to recover the plaintext message.

8. The method of claim 7, wherein said step of forming a first temporary key comprises forming $Y_i**sk$, where $Y_i$ is a public device unique key.

9. The method of claim 8, wherein said step of forming a second temporary key comprises forming $Y_f**sk$, where $Y_f$ is a public family key.

10. A device, used by a receiver, for decrypting a message sent from a sender to the receiver, where the message comprises the sender's ciphertext message concatenated to an access field, where the sender and the receiver agree on a session key, and where the access field comprises $g^{sk}$, where g is an element in a Galois Field and sk is the session key, and an encrypted version of an identification number combined with an encrypted version of the session key, comprising:

a) a shift-register, having an input for receiving the message sent by the sender, having a first output for transmitting $g^{sk}$ received from the sender, having a second output for transmitting an encrypted version of an identification number combined with an encrypted version of the session key received from the sender, and having a third output for transmitting the ciphertext message received from the sender;

b) a first means for performing a commutative one-way function, having a first input for receiving an element g of a Galois Field, having a second input for receiving the session key, and having an output;

c) a first comparator, having a first input connected to the first output of said shift-register, having a second input connected to the output of said first commutative one-way function means, and having an output that indicates whether or not the first and second input to the comparator match;

d) a second means for performing a commutative one-way function, having a first input for receiving a public device unique key $Y_i$, having a second input for receiving the session key, and having an output;

e) a third means for performing a commutative one-way function, having a first input for receiving a public family key $Y_f$, having a second input for receiving the session key, and having an output;

f) a symmetric-key encryptor, having a plaintext input for receiving the session key, having a key input connected to the output of said second commutative one-way function means, and having a ciphertext output;

g) a first symmetric-key decryptor, having a ciphertext input connected to the second output of said shift-register, having a key input connected to the output of said third commutative one-way function means, and having a plaintext output;

h) an extractor, having an input connected to the plaintext output of said first symmetric-key decryptor, and having an output for transmitting the sender's encrypted session key;

i) a second comparator, having a first input connected to the ciphertext output of said symmetric-key encryptor, having a second input connected to the output of said extractor, and having an output for indicating whether or not the sender's encrypted session key matches the receiver's encrypted session key; and g) a second symmetric-key decryptor, having a ciphertext input connected to the third output of said shift-register, having a key input for receiving the session key, and having a plaintext output at which the sender's plaintext message appears.

11. The device of claim 10, wherein the first, second, and third commutative one-way function means each comprise an exponentiator.

12. A method of recovering a plaintext message by a third party from a message sent from a sender to a receiver, where the message comprises the sender's ciphertext message concatenated to an access field, where the sender and the receiver agree on a session key, and where the access field comprises $g^{sk}$, where g is an element in a Galois Field and sk is the session key, and an encrypted version of an identification number combined with an encrypted version of the session key, comprising the steps of:

(a) forming a first temporary key;

(b) decrypting the encrypted version of an identification number combined with an encrypted version of the session key intercepted from the sender using the first temporary key;

(c) separating the result of step (b) into bits that are based on the sender's identification number and bits that are based the sender's encrypted session key;

(d) using the bits based on the sender's identification number to recover bits that mathematically relate the sender's $g^{sk}$ to the sender's first temporary key;

(e) forming a second temporary key using the result of step (d) and the $g^{sk}$ intercepted from the sender;

(f) decrypting the bits that are based on the sender's encrypted session key using the second temporary key to recover the sender's session key; and (g) decrypting the sender's ciphertext message using the sender's session key to recover the sender's plaintext message.

13. The method of claim 12, wherein said step of forming a first temporary key comprises forming $(g^{sk})**x_f$, where $x_f$ is a secret family key that is mathematically related to the public family key $Y_f$.

14. The method of claim 13, wherein said step of forming a second temporary key comprises forming $g^{sk}**x_i$, where $x_i$ is a secret unique key that is mathematically related to the sender's public device unique key $Y_i$.

15. A device, used by a third party to a message sent from a sender to a receiver, for intercepting the message and recovering the sender's plaintext message, where the message comprises the sender's ciphertext message concatenated to an access field, where the sender and the receiver agree on a session key, and where the access field comprises $g^{sk}$, where g is an element in a Galois Field and sk is the session key, and an encrypted version of an identification number combined with an encrypted version of the session key, comprising:

a) a shift-register, having an input for intercepting the message sent by the sender to the receiver, having a first output for transmitting $g^{sk}$ intercepted from the sender, having a second output for transmitting an encrypted version of an identification number combined with an encrypted version of the session key intercepted from the sender, and having a third output for transmitting the ciphertext message intercepted from the sender;

b) a first means for performing a commutative one-way function, having a first input for receiving a secret family key $x_f$ that corresponds to the sender's public family key $Y_f$, having a second input connected to the first output of said shift-register, and having an output;

c) a first symmetric-key decryptor, having a ciphertext input connected to the second output of said shift-register, having a key input connected to the output of said first commutative one-way function means, and having a plaintext output;

d) an extractor, having an input connected to the plaintext output of said first symmetric-key decryptor, and having a first output for transmitting bits based on the sender's identification number, and having a second output for transmitting bits based on the sender's encrypted session key;

e) a memory stored with data that mathematically relates bits based on the sender's identification number to the sender's public device unique key $Y_i$, having an address input connected to the first output of said extractor, and having an output;

f) a second means for performing a commutative one-way function, having a first input connected to the first output of said shift-register, having a second input connected to the output of said memory, and having an output;

g) a second symmetric-key decryptor, having a ciphertext input connected to the second output of said extractor, having a key input connected to the output of said second commutative one-way function means, and having a plaintext output; and h) a third symmetric-key decryptor, having a ciphertext input connected to the third output of said shift-register, having a key input connected to the plaintext output of said second symmetric-key decryptor, and having a plaintext output at which the sender's plaintext message appears.

16. The device of claim 15, wherein the first, second, and third commutative one-way function means each comprise an exponentiator.

17. A method of generating and using an access field, where a sender and a receiver agree on a session key, comprising the steps of;

(a) generating, randomly, an initialization vector;

(b) forming an exponent (m) using the session key and the initialization vector;

(c) forming $U=g^m \mod p$, where g is an element of order q in GF(p), where p is a prime number, and where p is a prime divisor of (p−1);

(d) forming a temporary device unique key;

(e) encrypting the session key with the temporary device unique key;

(f) forming a temporary family key;

(g) encrypting an identifier of the sender, a device unique public key of the sender, a signature of the device unique public key of the sender, and the encrypted session key using the temporary family key;

(h) concatenating a string of bits to the initialization vector;

(i) encrypting the session key using the result of step (h);

(j) encrypting a plaintext message using the result of step (i);

(k) concatenating a tag, the initialization vector, U, the result of step (g), and the result of step (j); and (1) transmitting the result of step (k) to the recipient.

18. The method of claim 17, wherein said step of forming an exponent comprises the step of mapping the session key and the initialization vector to an exponent.

19. The method of claim 17, wherein said step of forming a temporary device unique key comprises:

$t=h((Y_i**m) \mod p)$, where h is a function that maps a number to a key.

20. The method of claim 17, wherein said step of forming a temporary family key comprises:

$w=h((Y_f**m) \mod p)$, where h is a function that maps a number to a key.

21. The method of claim 18, wherein said step of forming a temporary device unique key comprises:

$t=h((Y_i**m) \mod p)$, where h is a function that maps a number to a key.

22. The method of claim 21, wherein said step of forming a temporary family key comprises:

$w=h((Y_f**m) \mod p)$, where h is a function that maps a number to a key.

23. A device for transmitting an encrypted message and an access field, where a sender and a receiver agree on a session key, comprising:

a) a means for uniquely mapping the session key and an initialization vector into an exponent m, having a first input for receiving the session key, having a second input for receiving the initialization vector, and having an output for transmitting the exponent m;

b) a first means for exponentiation, having a first input for receiving the exponent m from the output of the mapping means, having a second input for receiving a device unique public-key ($Y_i$), and having an output for transmitting $((Y_i**m) \mod p)$, where p is a prime number;

c) a second means for exponentiation, having a first input for receiving the exponent m from the output of the mapping means, having a second input for receiving a public family key ($Y_f$), and having an output for transmitting $((Y_f**m) \mod p)$;

d) a third means for exponentiation, having a first input for receiving the exponent m from the output of the mapping means, having a second input for receiving an element g of order q in GF(p), and having an output for transmitting $U=(g^m \mod p)$, where U forms a portion of the access field;

e) a first means for hashing, having an input for receiving $((Y_im) \mod p)$ from the first exponentiation means, and having an output for transmitting a temporary device unique key $(t=h((Y_im) \mod p))$, where the first hashing means uniquely maps a binary input string into a binary output string;

f) a second means for hashing, having an input for receiving $((Y_fm) \mod p)$ from the second exponentiation means, and having an output for transmitting a temporary family key $(w=h((Y_fm) \mod p))$, where the second hashing means uniquely maps a binary input string into a binary output string;

g) a first means for encryption, having a first input for receiving the session key as plaintext, having a second input for receiving the output of the first hashing means (t) as the key, and having an output for transmitting an encrypted version of the session key as ciphertext;

h) a means for receiving inputs of various bit lengths, concatenating the inputs, and outputting portions of the concatenated inputs in fixed block-lengths until all of the inputs are put out, having a first input for receiving a device identification number of the sender, a second input for receiving a digital signature of the sender, a third input for receiving a string of binary bits as a pad, a fourth input for receiving the device unique public key of the sender, a fifth input for receiving the output of the first encryption means, and an output for transmitting fixed block-length portions of the inputs;

i) a second means for encryption, having a first input connected to the output of said multiplexer for receiving plaintext, having a second input connected to the output of said second hashing means for receiving key, having a third input for receiving the initialization vector, and having an output for transmitting an encrypted version of the output of the means for receiving inputs of various bit lengths as ciphertext;

j) a means for concatenation, having a first input for receiving the initialization vector, a second input for receiving a string of binary bits, and an output for transmitting a binary string (z) that is the concatenation of the initialization vector and the string of binary bits;

k) a third means for encryption, having a first input for receiving the session key as plaintext, having a second input connected to the output of said concatenation means for receiving key, and having an output for transmitting an encrypted version of the session key as ciphertext;

l) a fourth means for encryption, having a first input for receiving the sender's plaintext message as plaintext, having a second input connected to the output of said third encryption means for receiving key, having a third input for receiving the initialization vector, and having an output for transmitting an encrypted version of the plaintext as ciphertext; and m) a shift-register, having a first input for receiving the initialization vector, a second input connected to the output of the third exponentiation means, a third input connected to the output of said second encryption means, a fourth input for receiving a string of binary bits, a fifth input connected to the output of said fourth encryption means, and an output for transmitting the ciphertext message concatenated to the access field.

24. The device of claim 23, wherein the first exponentiation means, the second exponentiation, and the third exponentiation means are each comprised of:

a) a multiplier;

b) a memory connected to said multiplier; and c) a means for modulo reducing the result of exponentiation, where said modulo reducing means is connected to said memory and said multiplier.

25. A method of recovering a plaintext message from an encrypted message concatenated to an access field, where a sender and a receiver agree on a session key, and where the access field comprises an initialization vector of the sender, a number U formed by the sender, and a string of bits representing an encrypted form of an identifier of the sender, a device unique public key of the sender, a signature of the sender, and an encrypted version of the session key, comprising the steps of:

(a) receiving a ciphertext message concatenated to an access field;

(b) recovering from the access field the initialization vector, the number U, and the encrypted form of the identifier of the sender, the device unique public key of the sender, the signature of the sender, and the encrypted version of the session key;

(c) forming an exponent (m);

(d) forming $U=g^m$ mod p, where g is an element of order q in GF (p), where p is a prime number, and where q is a prime divisor of (p−1);

(e) comparing U received in step (b) to U formed in step (d), proceeding with the next step if U received matches U formed, otherwise, stopping;

(f) forming a temporary family key;

(g) recovering the device unique public key of the sender, the signature of the sender, and the encrypted version of the session key from the portion of the access field that contains the encrypted form of the identifier of the sender, the device unique public key of the sender, the signature of the sender, and the encrypted version of the session key by decrypting this portion of the access field using the result of step (f);

(h) verifying the signature of the sender, proceeding to the next step if the signature is verified, otherwise, stopping;

(i) forming a temporary device unique key;

(j) recovering the session key from the encrypted version of the session key recovered in step (g) by decrypting the encrypted session key using the result of step (i);

(k) comparing the session key recovered in step (j) with the session key known by the recipient, proceeding with the next step if these two session keys match, otherwise, stopping;

(l) concatenating a string of bits to the initialization vector;

(m) encrypting the session key using the result of step (1) as key; and (n) recovering the plaintext message from the ciphertext message received from the sender by decrypting the ciphertext using the result of step (m) as key.

26. The method of claim 25, wherein said step of forming an exponent comprises the step of mapping the session key and the initialization vector to an exponent.

27. The method of claim 25, wherein said step of forming a temporary family key comprises:

$w=h((Y_f**m)$ mod p), where h is a function that maps a number to a key.

28. The method of claim 25, wherein said step of forming a temporary device unique key comprises:

$t=h((Y_i**m)$ mod p), where h is a function that maps a number to a key.

29. The method of claim 28, wherein said step of forming a temporary family key comprises:

$w=h((Y_f**m)$ mod p), where h is a function that maps a number to a key.

30. The method of claim 29, wherein said step of forming a temporary device unique key comprises:

$t=h((Y_i**m)$ mod p), where h is a function that maps a number to a key.

31. A device, used by a receiver, for decrypting an encrypted message concatenated to an access field, where a sender and the receiver agree on a session key, comprising:

a) a shift-register, having an input for receiving the encrypted message concatenated to an access field, having a first output for transmitting an initialization vector used by the sender, having a second output for transmitting $((g^m)$ mod p) generated by the sender; having a third output for transmitting an encrypted version of an identification number of the sender, a device unique public key of the sender, a digital signature of the sender, an encrypted version of the session key used by the sender, and a string of binary bits; having a fourth output for transmitting a string of bits received from the sender, and having a fifth output for transmitting a ciphertext message sent by the sender;

b) a means for uniquely mapping the session key and the initialization vector into an exponent m, having a first input for receiving the session key, having a second input connected to the first output of the shift-register for receiving the initialization vector, and having an output for transmitting the exponent m;

c) a first means for exponentiation, having a first input connected to the output of said mapping means, having a second input for receiving a public family key ($Y_f$), and having an output for transmitting (($Y_f$**m)mod p), where p is a prime number;

d) a second means for exponentiation, having a first input connected to the output of said mapping means, having a second input for receiving an element g of order q in GF(p), and having an output for transmitting ($g^m$ mod p);

e) a first comparator, having a first input connected to the second output of said shift-register, having a second input connected to the output of said second exponentiation means, and having an output that indicates whether or not the two inputs to said first comparator match, processing of the message received from the sender stops if the two inputs to the first comparator do not match;

f) a first means for hashing, having an input for receiving (($Y_f$m)mod p) from the first exponentiation means, and having an output for transmitting a temporary family key (w=h(($Y_f$m) mod p)), where the first hashing means uniquely maps a binary input string into a binary output string;

g) a first means for decryption, having a first input connected to the third output of said shift-register for receiving ciphertext, having a second input connected to the output of said first hashing means for receiving key, having a third input for receiving the initialization vector, and having an output for transmitting a decrypted version of the first input;

h) a means for storing data, having an input connected to the output of said first decryption means, having a first output for transmitting the first decrypted portion of V, having a second output for transmitting the second decrypted portion of V, having a third output for transmitting the third decrypted portion of V, and having a fourth output for transmitting the fourth decrypted portion of V;

i) a means for verifying a digital signature, having a first input connected to the fourth output of said shift-register, having a second input connected to the first output of said storage means, having a third input connected to the second output of said storage means, having a fourth input connected to the third output of said storage means, having a fifth input for receiving the public family key ($Y_f$), and having an output that indicates whether or not the digital signature of the sender has been verified, processing of the message received from the sender stops if the sender's digital signature is not verified;

j) a third means for exponentiation, having a first input connected to the output of said mapping means, having a second input connected to the second output of said storage means, and having an output for transmitting (($Y_i$**m)mod p), where p is a prime number;

k) a second means for hashing, having an input connected to the output of said third exponentiation means, and having an output for transmitting a temporary device unique key (t=h(($Y_i$**m) mod p)), where the second hashing means uniquely maps a binary input string into a binary output string;

l) a second means for decryption, having a first input connected to the fourth output of said storage device as ciphertext, having a second input connected to the output of said second hashing means for receiving key, and having an output for transmitting a decrypted version of the session key;

m) a second comparator, having a first input connected to the output of said second decryption means, having a second input for receiving the session key used by the sender, and having an output that indicates whether or not the two session keys match, processing of the message received from the sender stops if the two session keys do not match;

n) a means for concatenation, having a first input connected to the first output of said shift-register, having a second input for receiving a string of binary bits, and having an output for transmitting the concatenation of the first input and the second input;

o) a means for encryption, having a first input for receiving the session key known to the recipient as plaintext, having a second input for receiving the output of the concatenation means as key, and having an output for transmitting an encrypted version of the session key; and p) a third means for decryption, having a first input connected to the fifth output of said shift-register for receiving ciphertext, having a second input connected to the output of said encryption means for receiving key, having a third input for receiving the initialization vector, and having an output for transmitting the plaintext of the ciphertext message intercepted.

32. The device of claim 31, wherein the first exponentiation means, the second exponentiation means, and the third exponentiation means are each comprised of:

a) a multiplier;

b) a memory connected to said multiplier; and c) a means for modulo reducing the result of exponentiation, where said modulo reducing means is connected to said memory and said multiplier.

33. A method of intercepting and recovering a plaintext message by a third party from an encrypted message concatenated to an access field sent from a sender to a receiver, where the access field comprises an initialization vector of the sender, a number U formed by the sender, and a string of bits representing an encrypted form of an identifier of the sender, a device unique public key of the sender, a signature of the sender, and an encrypted version of a session key, comprising the steps of:

(a) intercepting the encrypted message concatenated to the access field, where the encrypted message concatenated to the access field was sent from the sender to the recipient;

(b) recovering the initialization vector, the number U, and the encrypted identifier of the sender, the device unique public key of the sender, the signature of the sender, and the encrypted session key from the access field;

(c) forming a temporary family key;

(d) recovering the identifier of the sender, the device unique public key of the sender, the signature of the sender, and the encrypted session key by decrypting the portion of the access field that contains the identifier of the sender, the device unique public key of the sender, the signature of the sender, and the encrypted session key using the result of step (c);

(e) requesting the secret unique key held by each escrow agent based on the identifier of the sender recovered in step (d);

(f) combining the secret unique keys received as a result of step (e);

(g) forming a temporary device unique key;

(h) recovering the session key by decrypting the encrypted session key using the result of step (g);

(i) concatenating a string of bits to the initialization vector;

(j) encrypting the session key using the result of step (i); and (k) recovering the plaintext message by decrypting the ciphertext using the result of step (j).

34. The method of claim 33, wherein said step of forming a temporary family key comprises:

$w = h((U**x_f) \mod p)$, where h is a function that maps a number to a key.

35. The method of claim 33, wherein said step of forming a temporary device unique key comprises:

$t = h((U**x_i) \mod p)$, where h is a function that maps a number to a key.

36. The method of claim 35, wherein said step of forming a temporary device unique key comprises:

$t = h((U**x_i) \mod p)$, where h is a function that maps a number to a key.

37. A device, used by a third party, for decrypting an intercepted encrypted message concatenated to an access field which was sent by a sender to a receiver, comprising:

a) a shift-register, having an input for receiving the intercepted message, having a first output for transmitting an initialization vector used by the sender, having a second output for transmitting $U = ((g^m) \mod p)$ generated by the sender; having a third output for transmitting an encrypted version of an identification number of the sender, a device unique public key of the sender, a digital signature of the sender, an encrypted version of the session key used by the sender, and a string of binary bits; having a fourth output for transmitting a string of binary bits transmitted by the sender, and having a fifth output for transmitting a ciphertext message sent by the sender to the recipient;

b) a first means for exponentiation, having a first input for receiving the second output of the shift-register, having a second input for receiving a secret family key $(x_f)$, and having an output for transmitting $((U**x_f) \mod p)$, where p is prime number;

c) a first means for hashing, having an input connected to the output of said first exponentiation means, and having an output for transmitting a temporary family key $(w = h((U**x_f) \mod p))$, where the first hashing means uniquely maps a binary input string into a binary output string;

d) a first means for decryption, having a first input connected to the third output of said shift-register for receiving ciphertext, having a second input connected to the output of said first hashing means for receiving key, having a third input for receiving the initialization vector, and having an output for transmitting a decrypted version of the first input;

e) a means for storing data, having an input connected to the output of said first decryption means, having a first output for transmitting the identification number of the sender, having a second output for transmitting the device unique public key of the sender, having a third output for transmitting the digital signature of the sender, and having a fourth output for transmitting the encrypted version of the session key used by the sender;

f) a means for verifying a digital signature, having a first input for receiving the public family key $(Y_f)$, having a second input connected to the fourth output of said shift-register, having a third input connected to the first output of said storage means, having a fourth input connected to the second output of said storage means, having a fifth input connected to the third output of storage means, and having an output that indicates whether or not the digital signature of the sender has been verified, processing of the message intercepted from the sender stops if the sender's digital signature is not verified;

g) a means for adding, having a first input for receiving one part of an escrowed key held by an escrow agent, having a second input for receiving a second part of an escrowed key held by a second escrow agent, and having an output for transmitting $((x_i = x_{i1} + x_{i2}) \mod q)$, where q is a prime divisor of $(p-1)$, and where p is a prime number;

h) a second means for exponentiation, having a first input connected to the second output of said shift-register, having a second input connected to the output of said adding means, and having an output for transmitting $((U**x_i) \mod p)$;

i) a second means for hashing, having an input for receiving the output of said second exponentiation means, and having an output for transmitting a temporary device unique key $(t = h((U**x_i) \mod p))$, where the second hashing means uniquely maps a binary input string into a binary output string;

j) a second means for decryption, having a first input connected to the fourth output of said storage means for receiving ciphertext, having a second input connected to the output of said second hashing means for receiving key, and having an output for transmitting a decrypted version of the session key;

k) a means for concatenation, having a first input for receiving the first output of said shift-register, having a second input for receiving a string of binary bits, and having an output for transmitting the result of concatenating the first input and the second input to said concatenation means;

l) a means for encryption, having a first input connected to the output of said second decryption means for receiving plaintext, having a second input connected to the output of said concatenation means for receiving key, and having an output for transmitting an encrypted version of the session key; and m) a third means for decryption, having a first input connected to the fifth output of said shift-register for receiving ciphertext, having a second input connected to the output of said encryption means for receiving key, having a third input for receiving the initialization vector, and having an output for transmitting the plaintext of the ciphertext intercepted.

38. The device of claim 37, wherein the first exponentiation means, and the second exponentiation are each comprised of:

a) a multiplier;

b) a memory connected to said multiplier; and c) a means for modulo reducing the result of exponentiation, where said modulo reducing means is connected to said memory and said multiplier.

* * * * *